US010812534B2

(12) United States Patent
Chong et al.

(10) Patent No.: US 10,812,534 B2
(45) Date of Patent: Oct. 20, 2020

(54) SERVICE PROCESSING METHOD AND APPARATUS

(71) Applicant: HUAWEI TECHNOLOGIES CO., LTD., Shenzhen, Guangdong (CN)

(72) Inventors: Weiwei Chong, Shanghai (CN); Xiaobo Wu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 17 days.

(21) Appl. No.: 16/226,183

(22) Filed: Dec. 19, 2018

(65) Prior Publication Data

US 2019/0124124 A1 Apr. 25, 2019

Related U.S. Application Data

(63) Continuation of application No. PCT/CN2016/087766, filed on Jun. 29, 2016.

(51) Int. Cl.
H04W 36/14 (2009.01)
H04L 29/06 (2006.01)
H04W 48/18 (2009.01)
H04W 36/38 (2009.01)
H04W 76/18 (2018.01)
(Continued)

(52) U.S. Cl.
CPC ...... H04L 65/1016 (2013.01); H04L 65/1069 (2013.01); H04L 65/1073 (2013.01); H04W 8/04 (2013.01); H04W 12/06 (2013.01); H04W 36/0022 (2013.01); H04W 36/125 (2018.08); H04W 36/14 (2013.01); H04W 36/385 (2013.01); H04W 48/18 (2013.01); H04W 76/18 (2018.02); H04W 84/042 (2013.01)

(58) Field of Classification Search
CPC ............. H04L 65/1016; H04L 65/1073; H04L 65/1069; H04L 65/1046; H04W 76/18; H04W 36/385; H04W 48/18; H04W 36/14; H04W 36/0022; H04W 12/06; H04W 8/04; H04W 36/125; H04W 84/042
See application file for complete search history.

(56) References Cited

U.S. PATENT DOCUMENTS

2015/0282012 A1 10/2015 Baek et al.
2016/0029228 A1* 1/2016 Mufti ................... H04W 24/04
370/225

FOREIGN PATENT DOCUMENTS

CN 104427524 A 3/2015
CN 104507131 A 4/2015
(Continued)

OTHER PUBLICATIONS

SA WG2, "Cover Sheet for TR 23.750 to TSG SA for Approval", 3GPP SA #72, SP-160329, Busan, South Korea, Jun. 15-17, 2016, 1 page.
(Continued)

Primary Examiner — Thai Nguyen
(74) Attorney, Agent, or Firm — Fish & Richardson P.C.

(57) ABSTRACT

The present disclosure relates to example service processing methods and devices. In one example method, a request message for setting up a Voice over Long Term Evolution (VoLTE) service for a user equipment (UE) in a packet switched (PS) domain is received by an Internet Protocol multimedia subsystem (IMS) core network device. The IMS core network device triggers a circuit switched fallback (CSFB) service of the UE after determining that the VoLTE service cannot be set up in the PS domain.

18 Claims, 8 Drawing Sheets

(51) Int. Cl.

| | | |
|---|---|---|
| *H04W 36/12* | (2009.01) | |
| *H04W 8/04* | (2009.01) | |
| *H04W 12/06* | (2009.01) | |
| *H04W 36/00* | (2009.01) | |
| *H04W 84/04* | (2009.01) | |

(56) References Cited

FOREIGN PATENT DOCUMENTS

| | | | | |
|---|---|---|---|---|
| CN | 104717716 A | 6/2015 | | |
| JP | 2012244197 A | 12/2012 | | |
| KR | 20150023164 A | 3/2015 | | |
| WO | WO-2016101972 A1 | * | 6/2016 | ......... H04L 65/1016 |

OTHER PUBLICATIONS

3GPP TR 23.750 V1.0.0 (Jun. 2016), 3rd Generation Partnership Project; Technical Specification Group Services and System Aspects; Study for robust call setup for VoLTE subscriber in LTE(Release 14), Jun. 2016, 30 pages.
Office Action issued in Japanese Application No. 2018564750 dated Oct. 15, 2019, 13 pages (Wtih English Translation).
XP051295183 3GPP TR 23.750 V14.0.0 (Jun. 2016),3rd Generation Partnership Project;Technical Specification Group Services and System Aspects;Study for robust call setup for VoLTE subscriber in LTE(Release 14),total 30 pages.
3GPP TS 23.272 V13.4.0 (Jun. 2016),3rd Generation Partnership Project;Technical Specification Group Services and System Aspects;Circuit Switched (CS) fallback in Evolved Packet System (EPS);Stage 2(Release 13),dated Jun. 22, 2016,total 103 pages.
3GPP TS 23.237 V14.0.0 (Jun. 2016),3rd Generation Partnership Project;Technical Specification Group Services and System Aspects;IP Multimedia Subsystem (IMS) Service Continuity;Stage 2(Release 14),dated Jun. 22, 2016,total 174 pages.
3GPP TS 23.228 V13.6.0 (Jun. 2016),3rd Generation Partnership Project;Technical Specification Group Services and System Aspects;IP Multimedia Subsystem (IMS);Stage 2(Release 13),dated Jun. 22, 2016,total 314 pages.
3GPP TS 24.229 V14.0.0 (Jun. 2016),3rd Generation Partnership Project;Technical Specification Group Core Network and Terminals;IP multimedia call control protocol based onSession Initiation Protocol (SIP)and Session Description Protocol (SDP);Stage 3(Release 14),dated Jun. 24,2016.

3GPP TS 24.292 V13.3.0 (Jun. 2016),3rd Generation Partnership Project;Technical Specification Group Core Network and Terminals;IP Multimedia (IM) Core Network (CN) subsystemCentralized Services (ICS);Stage 3(Release 13),dated Jun. 24, 2016, total 183 pages.
3GPP TS 29.214 V14.0.0 (Jun. 2016),3rd Generation Partnership Project;Technical Specification Group Core Network and Terminals; Policy and Charging Control over Rx reference point(Release 14),dated Jun. 23, 2016, total 73 pages.
S2-161710 ZTE Corporation,"Update to solution 2",SA WG2 Meeting #114, Apr. 11-15, 2016, Sophia Antipolis, France,total 2 pages.
S2-162167 ZTE Corporation,"MSC Retry Solution for Rob VoLTE",SA WG2 Meeting #114,Apr. 11-15, 2016, Sophia Antipolis, France,total 4 pages.
S2-162166 Nokia,"Removal of EN on solution 2, and adding evaluation texts",SA WG2 Meeting #114,Apr. 11-15, 2016, Sophia Antipolis, France,total 3 pages.
S2-161972 Ericsson,"Optimized CSFB procedure",SA WG2 Meeting #S2-114,Apr. 11-15 Sophia Antipolis, France,total 3 pages.
S2-161973 Ericsson,"eCSFB Solution: Enabling Provisioning of target cell(s) system information",SA WG2 Meeting #S2-114,Apr. 11-15 Sophia Antipolis, France,total 2 pages.
S2-161974 Ericsson,"UE radio capabilities consideration during PLMN and RAT selection",SA WG2 Meeting #S2-114,Apr. 11-15 Sophia Antipolis, France,total 2 pages.
S2-162529 ZTE,"Update solution 6 with Retry in CS domain",SA WG2 Meeting #115,May 23-27, 2016, Nanjing, P.R. China,total 5 pages.
S2-162452 Huawei et al.,"Support for P-CSCF sending a response to UE or IMS network when receiving Bearer Setup Request Rejection for QCI=1",SA WG2 Meeting #S2-115,May 23-27, 2016, Nanjing, P.R. China ,total 3 pages.
S2-153081 Huawei et al.,"New WID on enhanced VoLTE",SA WG2 Meeting #111,Oct. 19-23, 2015, Chengdu, China,total 4 pages.
Extended European Search Report issued in European Application No. 16906677.6 dated Jan. 4, 2019, 10 pages.
International Search Report and Written Opinion issued in International Application No. PCT/CN2016/087766 dated Mar. 31, 2017, 24 pages.
Office Action issued in Korean Application No. 2018-7034710 dated Jan. 15, 2020, 8 pages (with English translation).
Huawei et al., "Solution for challenging VoLTE coverage," 3GPP TSG-SA WG2#111, S2-153080, Oct. 13, 2015, 12 pages.
Office Action issued in Japanese Application No. 2018-564750 on Jun. 8, 2020, 5 pages.

* cited by examiner

SERVICE PROCESSING METHOD AND APPARATUS

CROSS-REFERENCE TO RELATED APPLICATIONS

This application is a continuation of International Patent Application No. PCT/CN2016/087766, filed on Jun. 29, 2016. The disclosure of the aforementioned application is hereby incorporated by reference in the entity.

TECHNICAL FIELD

This application relates to the field of communications technologies, and in particular, to a service processing method and an apparatus.

BACKGROUND

A voice service of a Long Term Evolution (LTE) network is referred to as a Voice over Long Term Evolution (VoLTE) service. Currently, a growing quantity of operators launch commercial VoLTE services, and an increasing quantity of user equipment (UE) can support the VoLTE service. The VoLTE is a voice technology based on IP (Internet Protocol) data transmission, and all services are carried on the LTE network, so that data and voice services are unified in a same network.

Compared with a conventional circuit switched domain voice service, the current VoLTE service does not fully support various supplementary services associated with voice calls. For example, an original customized Ring Back Tone service, call transfer service, and voice mailbox service may not be supported. In addition, in some networks in which the VoLTE service is not fully activated for a user, when a user who subscribes to the VoLTE service roams to a network coverage area in which the VoLTE service is not activated, the VoLTE service cannot be used. This severely affects user call quality.

SUMMARY

This disclosure provides a service processing method and an apparatus, so as to resolve a technical problem of low call completion rate of a voice service of user equipment caused by a reattempt to set up a VoLTE service when the VoLTE service cannot be set up.

This disclosure provides a service processing method, and the method includes:

receiving, by an Internet Protocol multimedia subsystem IMS core network device, a request message for setting up a Voice over Long Term Evolution VoLTE service for user equipment UE in a packet switched PS domain; and after determining that the VoLTE service cannot be set up in the PS domain, triggering, by the IMS core network device, a circuit switched fallback CSFB service of the UE.

In this way, the IMS core network device receives the request message for setting up the VoLTE service for the UE, and triggers the CSFB service of the UE after determining that the VoLTE service cannot be set up, so as to directly trigger the CSFB service of the UE when the VoLTE service cannot be set up, without reattempting to set up the VoLTE service, thereby increasing a call completion rate of the user equipment, ensuring a voice service and a supplementary service that are requested by the UE, and ensuring good user experience.

Optionally, the IMS core network device determines that the VoLTE service cannot be set up in the PS domain by determining existence of at least one of the following cases:

the IMS core network device obtains at least one supplementary service associated with the VoLTE service, and determines that the at least one supplementary service is unavailable;

the IMS core network device determines that a service network in which the UE is currently located does not support the VoLTE service; and the IMS core network device determines that setup of voice bearer of the VoLTE service in the PS domain fails.

In this way, when an unavailable supplementary service exists, a service network in which the UE is currently located does not support the VoLTE service, or setup of voice bearer of the VoLTE service fails, the IMS core network device determines that the VoLTE service cannot be set up in the PS domain. In the three cases, a case that may occur during a process of setting up the VoLTE service in the PS domain and that the VoLTE service cannot be set up is comprehensively considered, so as to effectively trigger the CSFB service of the UE, and avoid attempting to set up the VoLTE service as much as possible.

Optionally, that the IMS core network device obtains at least one supplementary service associated with the VoLTE service includes:

obtaining, by the IMS core network device based on subscription information of the UE, the at least one supplementary service associated with the VoLTE service; or obtaining, by the IMS core network device from a supplementary service setup request message sent by the UE, the at least one supplementary service associated with the VoLTE service.

In this way, the IMS core network device may obtain at least one supplementary service in the foregoing two manners, so that whether an unavailable supplementary service exists can be subsequently determined.

Optionally, that the IMS core network device determines that a service network in which the UE is currently located does not support the VoLTE service includes: determining, by the IMS core network device, that a VoLTE service function is not activated in a visited public land mobile network VPLMN in which the UE is located or no VoLTE service roaming agreement is signed between the VPLMN in which the UE is located and a home public land mobile network HPLMN.

In this way, the two aspects may be used to determine whether the service network in which the UE is currently located supports the VoLTE service, that is, whether the VoLTE service function is activated in the VPLMN and whether a VoLTE service roaming agreement is signed between the VPLMN and the HPLMN, so that various cases in which the VoLTE service is not supported are comprehensively considered, thereby making a determining result more accurate, and providing an accurate basis for determining whether to trigger the CSFB service of the UE.

Optionally, the IMS core network device determines that the VoLTE service function is not activated in the visited public land mobile network VPLMN in which the UE is located by determining existence of at least one of the following cases:

the VPLMN is not on a whitelist of networks in which a VoLTE service function is activated;

the VPLMN is on a blacklist of networks in which the VoLTE service function is not activated;

no VoLTE service roaming agreement is signed between the VPLMN and the home public land mobile network HPLMN;

a proxy-call session control function P-CSCF of the VPLMN is not on a whitelist of networks that support the VoLTE service function; and the P-CSCF of the VPLMN is on a blacklist of networks that do not support the VoLTE service function.

In this way, in this disclosure, whether the VoLTE service function is activated in the VPLMN may be determined based on an actual situation from the foregoing perspectives.

Optionally, that the IMS core network device determines that setup of voice bearer of the VoLTE service in the PS domain fails includes:

receiving, by the IMS core network device, a re-Authentication-Request RAR message or an Abort-Session-Request ASR message; and after determining that the RAR message or the ASR message carries indication information that is used to indicate insufficiency of a bearer resource or indication information that is used to indicate a resource allocation failure, determining, by the IMS core network device, that the setup of voice bearer of the VoLTE service in the PS domain fails.

In this way, the IMS core network device may determine, based on the indication information carried in the RAR message or the ASR message, that setup of voice bearer of the VoLTE service fails.

Optionally, the RAR message or the ASR message includes a cause value of the voice bearer setup failure of the VoLTE service.

In this way, the RAR message or the ASR message carries the cause value of the voice bearer setup failure of the VoLTE service, so that the IMS core network device can record a specific reason of the voice bearer setup failure, thereby providing a basis for subsequent analysis.

Optionally, the cause value that is of the voice bearer setup failure of the VoLTE service and that is included in the RAR message or the ASR message is that the UE is in a weak coverage area in the PS domain.

Optionally, before the triggering, by the IMS core network device, a CSFB service of the UE, the method further includes:

determining, by the IMS core network device, that the UE has registered with a circuit switched domain.

In this way, in this disclosure, the IMS core network device may trigger the CSFB service of the UE only after determining that the UE has registered with the circuit switched domain. When the IMS core network device determines that the UE has not registered with the circuit switched domain, even if the IMS core network device determines that the VoLTE service cannot be set up, the IMS core network device may not trigger the CSFB service of the UE. In this manner, the CSFB service of the UE can be triggered only after the UE has registered with the circuit switched domain, so as to ensure that the CSFB service is successfully triggered. If the UE has not registered with the circuit switched domain, the CSFB service does not need to be triggered, so that a redundant trigger procedure is avoided, thereby saving processing resources.

Optionally, the determining, by the IMS core network device, that the UE has registered with a circuit switched domain includes:

obtaining, by the IMS core network device from a home subscriber server HSS or a home location register HLR, information registered by the UE with a circuit switched CS network; and determining, by the IMS core network device based on the information registered by the UE with the CS network, that the UE has registered with the circuit switched domain.

Optionally, the UE is originating UE of the VoLTE service.

The triggering, by the IMS core network device, a CSFB service of the UE includes:

sending, by the IMS core network device, a first message to the originating UE, where the first message is used to trigger the originating UE to initiate an originating circuit switched fallback CSFB service.

In this way, the IMS core network device triggers the originating UE to initiate the originating CSFB service by sending the first message to the originating UE, so as to quickly trigger the CSFB service.

Optionally, the first message includes a first cause value, and the first cause value is used to notify the originating UE of a specific reason why the VoLTE service is unavailable.

In this way, the first cause value is sent to the originating UE, so that the originating UE can perform recording, thereby providing a basis for a subsequent process such as statistical analysis.

Optionally, before the sending, by the IMS core network device, a first message to the originating UE, the method further includes:

determining, by the IMS core network device, that terminating UE corresponding to the originating UE is in a pre-alerting state.

In this way, in this disclosure, the IMS core network device may trigger the CSFB service of the UE only after determining that the terminating UE corresponding to the originating UE is in the pre-alerting state. When the IMS core network device determines that the terminating UE corresponding to the originating UE is alerting, even if the IMS core network device determines that the VoLTE service cannot be set up, the IMS core network device may not trigger the CSFB service of the UE. In this manner, the CSFB service of the UE can be triggered only after the terminating UE corresponding to the originating UE is in the pre-alerting state, so that unawareness of a user is ensured. If the terminating UE corresponding to the originating UE is alerting, the CSFB service does not need to be triggered, so that a redundant trigger procedure is avoided, thereby saving processing resources.

Optionally, the IMS core network device is a serving call session control function I/S-CSCF of an originating side, a service centralization and continuity application server SCC AS of an originating side, or a proxy-call session control function P-CSCF of an originating side.

Optionally, the UE is terminating UE of the VoLTE service.

The triggering, by the IMS core network device, a CSFB service of the UE includes:

sending, by the IMS core network device, a second message to a terminating domain selection device, where the second message is used to indicate that terminating service setup in the PS domain fails, so that the terminating domain selection device triggers a terminating circuit switched fallback CSFB service of the terminating UE.

In this way, the IMS core network device triggers the CSFB service of the terminating UE by sending the second message to the terminating UE, so as to quickly trigger the CSFB service.

Optionally, the second message includes a second cause value, and the second cause value is used to notify the terminating domain selection device of a specific reason why the terminating setup in the PS domain fails.

In this way, the second cause value is sent to the terminating domain selection device, so that the terminating domain selection device can perform recording, thereby providing a basis for a subsequent process such as statistical analysis.

Optionally, before the sending, by the IMS core network device, a second message to a terminating domain selection device, the method further includes:

determining, by the IMS core network device, that the terminating UE is in a pre-alerting state.

In this way, in this disclosure, the IMS core network device may trigger the CSFB service of the UE only after determining that the terminating UE is in the pre-alerting state. When the IMS core network device determines that the terminating UE is alerting, even if the IMS core network device determines that the VoLTE service cannot be set up, the IMS core network device may not trigger the CSFB service of the UE. In this manner, the CSFB service of the UE can be triggered only after the terminating UE is in the pre-alerting state, so that unawareness of a user is ensured. If the terminating UE is alerting, the CSFB service does not need to be triggered, so that a redundant trigger procedure is avoided, thereby saving processing resources.

Optionally, the IMS core network device is a serving call session control function I/S-CSCF of a terminating side, a service centralization and continuity application server SCC AS of a terminating side, or a proxy-call session control function P-CSCF of a terminating side.

Optionally, the sending, by the IMS core network device, a second message to a terminating domain selection device includes:

sending, by the P-CSCF of the terminating side, the second message to the I/S-CSCF of the terminating side, so that the I/S-CSCF of the terminating side forwards the second message to the terminating domain selection device.

This disclosure provides an IMS core network device, and the IMS core network device includes a transceiver module and a processing module.

The transceiver module is configured to receive a request message for setting up a Voice over Long Term Evolution VoLTE service for user equipment UE in a packet switched PS domain.

The processing module is configured to trigger a circuit switched fallback CSFB service of the UE after determining that the VoLTE service cannot be set up in the PS domain.

Optionally, the processing module is specifically configured to determine that the VoLTE service cannot be set up in the PS domain by determining existence of at least one of the following cases:

at least one supplementary service associated with the VoLTE service is obtained, and it is determined that the at least one supplementary service is unavailable;

it is determined that a service network in which the UE is currently located does not support the VoLTE service; and it is determined that setup of voice bearer of the VoLTE service in the PS domain fails.

Optionally, the processing module obtains the at least one supplementary service associated with the VoLTE service in the following manner:

obtaining, based on subscription information of the UE, the at least one supplementary service associated with the VoLTE service; or obtaining, from a supplementary service setup request message sent by the UE, the at least one supplementary service associated with the VoLTE service.

Optionally, the processing module is specifically configured to determine, in the following manner, that the service network in which the UE is currently located does not support the VoLTE service: determining that a VoLTE service function is not activated in a visited public land mobile network VPLMN in which the UE is located or no VoLTE service roaming agreement is signed between the VPLMN in which the UE is located and a home public land mobile network HPLMN.

Optionally, the processing module is specifically configured to determine that the VoLTE service function is not activated in the visited public land mobile network VPLMN in which the UE is located by determining existence of at least one of the following cases:

the VPLMN is not on a whitelist of networks in which a VoLTE service function is activated;

the VPLMN is on a blacklist of networks in which the VoLTE service function is not activated;

no VoLTE service roaming agreement is signed between the VPLMN and the home public land mobile network HPLMN;

a proxy-call session control function P-CSCF of the VPLMN is not on a whitelist of networks that support the VoLTE service function; and the P-CSCF of the VPLMN is on a blacklist of networks that do not support the VoLTE service function.

Optionally, the processing module is specifically configured to determine, in the following manner, that the setup of voice bearer of the VoLTE service in the PS domain fails:

receiving a Re-Authentication-Request RAR message or an Abort-Session-Request ASR message by using the transceiver module; and after it is determined that the RAR message or the ASR message carries indication information that is used to indicate insufficiency of a bearer resource or indication information that is used to indicate a resource allocation failure, determining that the setup of voice bearer of the VoLTE service in the PS domain fails.

Optionally, the RAR message or the ASR message includes a cause value of the voice bearer setup failure of the VoLTE service.

Optionally, the cause value that is of the voice bearer setup failure of the VoLTE service and that is included in the RAR message or the ASR message is that the UE is in a weak coverage area in the PS domain.

Optionally, before triggering the CSFB service of the UE, the processing module is further configured to:

determine that the UE has registered with a circuit switched domain.

Optionally, the processing module is specifically configured to determine, in the following manner, that the UE has registered with the circuit switched domain:

obtaining, from a home subscriber server HSS or a home location register HLR, information registered by the UE with a circuit switched CS network; and determining, based on the information registered by the UE with the CS network, that the UE has registered with the circuit switched domain.

Optionally, the UE is originating UE of the VoLTE service.

The processing module is specifically configured to trigger the CSFB service of the UE in the following manner:

sending a first message to the originating UE by using the transceiver module, where the first message is used to trigger the originating UE to initiate an originating circuit switched fallback CSFB service.

Optionally, the first message includes a first cause value, and the first cause value is used to notify the originating UE of a specific reason why the VoLTE service is unavailable.

Optionally, before sending the first message to the originating UE by using the transceiver module, the processing module is further configured to:

determine that terminating UE corresponding to the originating UE is in a pre-alerting state.

Optionally, the IMS core network device is a serving call session control function I/S-CSCF of an originating side, a service centralization and continuity application server SCC AS of an originating side, or a proxy-call session control function P-CSCF of an originating side.

Optionally, the UE is terminating UE of the VoLTE service.

The processing module is specifically configured to trigger the CSFB service of the UE in the following manner:

sending a second message to a terminating domain selection device by using the transceiver module, where the second message is used to indicate that terminating service setup in the PS domain fails, so that the terminating domain selection device triggers a terminating circuit switched fallback CSFB service of the terminating UE.

Optionally, the second message includes a second cause value, and the second cause value is used to notify the terminating domain selection device of a specific reason why the terminating setup in the PS domain fails.

Optionally, before sending the second message to the terminating domain selection device by using the transceiver module, the processing module is further configured to:

determine that the terminating UE is in a pre-alerting state.

Optionally, the IMS core network device is a serving call session control function I/S-CSCF of a terminating side, a service centralization and continuity application server SCC AS of a terminating side, or a proxy-call session control function P-CSCF of a terminating side.

Optionally, the sending, by the processing module, a second message to a terminating domain selection device by using the transceiver module is specifically:

sending, by the processing module of the P-CSCF of the terminating side, the second message to the I/S-CSCF of the terminating side by using the transceiver module, so that the I/S-CSCF of the terminating side forwards the second message to the terminating domain selection device.

This disclosure provides another IMS core network device, and the IMS core network device includes a communications interface and a processor.

The communications interface is configured to receive a request message for setting up a Voice over Long Term Evolution VoLTE service for user equipment UE in a packet switched PS domain.

The processor is configured to trigger a circuit switched fallback CSFB service of the UE after determining that the VoLTE service cannot be set up in the PS domain.

Optionally, the processor is specifically configured to determine that the VoLTE service cannot be set up in the PS domain by determining existence of at least one of the following cases:

at least one supplementary service associated with the VoLTE service is obtained, and it is determined that the at least one supplementary service is unavailable;

it is determined that a service network in which the UE is currently located does not support the VoLTE service; and it is determined that setup of voice bearer of the VoLTE service in the PS domain fails.

Optionally, the processor obtains the at least one supplementary service associated with the VoLTE service in the following manner:

obtaining, based on subscription information of the UE, the at least one supplementary service associated with the VoLTE service; or obtaining, from a supplementary service setup request message sent by the UE, the at least one supplementary service associated with the VoLTE service.

Optionally, the processor is specifically configured to determine, in the following manner, that the service network in which the UE is currently located does not support the VoLTE service: determining that a VoLTE service function is not activated in a visited public land mobile network VPLMN in which the UE is located or no VoLTE service roaming agreement is signed between the VPLMN in which the UE is located and a home public land mobile network HPLMN.

Optionally, the processor is specifically configured to determine that the VoLTE service function is not activated in the visited public land mobile network VPLMN in which the UE is located by determining existence of at least one of the following cases:

the VPLMN is not on a whitelist of networks in which a VoLTE service function is activated;

the VPLMN is on a blacklist of networks in which the VoLTE service function is not activated;

no VoLTE service roaming agreement is signed between the VPLMN and the home public land mobile network HPLMN;

a proxy-call session control function P-CSCF of the VPLMN is not on a whitelist of networks that support the VoLTE service function; and the P-CSCF of the VPLMN is on a blacklist of networks that do not support the VoLTE service function.

Optionally, the processor is specifically configured to determine, in the following manner, that the setup of voice bearer of the VoLTE service in the PS domain fails:

receiving a Re-Authentication-Request RAR message or an Abort-Session-Request ASR message by using the communications interface; and after it is determined that the RAR message or the ASR message carries indication information that is used to indicate insufficiency of a bearer resource or indication information that is used to indicate a resource allocation failure, determining that the setup of voice bearer of the VoLTE service in the PS domain fails.

Optionally, the RAR message or the ASR message includes a cause value of the voice bearer setup failure of the VoLTE service.

Optionally, the cause value that is of the voice bearer setup failure of the VoLTE service and that is included in the RAR message or the ASR message is that the UE is in a weak coverage area in the PS domain.

Optionally, before triggering the CSFB service of the UE, the processor is further configured to:

determine that the UE has registered with a circuit switched domain.

Optionally, the processor is specifically configured to determine, in the following manner, that the UE has registered with the circuit switched domain:

obtaining, from a home subscriber server HSS or a home location register HLR, information registered by the UE with a circuit switched CS network; and determining, based on the information registered by the UE with the CS network, that the UE has registered with the circuit switched domain.

Optionally, the UE is originating UE of the VoLTE service.

The processor is specifically configured to trigger the CSFB service of the UE in the following manner:

sending a first message to the originating UE by using the communications interface, where the first message is used to trigger the originating UE to initiate an originating circuit switched fallback CSFB service.

Optionally, the first message includes a first cause value, and the first cause value is used to notify the originating UE of a specific reason why the VoLTE service is unavailable.

Optionally, before sending the first message to the originating UE by using the communications interface, the processor is further configured to:

determine that terminating UE corresponding to the originating UE is in a pre-alerting state.

Optionally, the IMS core network device is a serving call session control function I/S-CSCF of an originating side, a service centralization and continuity application server SCC AS of an originating side, or a proxy-call session control function P-CSCF of an originating side.

Optionally, the UE is terminating UE of the VoLTE service.

The processor is specifically configured to trigger the CSFB service of the UE in the following manner:

sending a second message to a terminating domain selection device by using the communications interface, where the second message is used to indicate that terminating service setup in the PS domain fails, so that the terminating domain selection device triggers a terminating circuit switched fallback CSFB service of the terminating UE.

Optionally, the second message includes a second cause value, and the second cause value is used to notify the terminating domain selection device of a specific reason why the terminating setup in the PS domain fails.

Optionally, before sending the second message to the terminating domain selection device by using the communications interface, the processor is further configured to:

determine that the terminating UE is in a pre-alerting state.

Optionally, the IMS core network device is a serving call session control function I/S-CSCF of a terminating side, a service centralization and continuity application server SCC AS of a terminating side, or a proxy-call session control function P-CSCF of a terminating side.

Optionally, the sending, by the processor, a second message to a terminating domain selection device by using the communications interface is specifically:

sending, by the processor of the P-CSCF of the terminating side, the second message to the I/S-CSCF of the terminating side by using the communications interface, so that the I/S-CSCF of the terminating side forwards the second message to the terminating domain selection device.

In embodiments of this disclosure, the IMS core network device receives the request message for setting up the VoLTE service for the UE. After determining that the VoLTE service cannot be set up, the IMS core network device triggers the CSFB service of the UE, so as to directly trigger the CSFB service of the UE when the VoLTE service cannot be set up, without reattempting to set up the VoLTE service, thereby increasing a call completion rate of the user equipment, ensuring a voice service and a supplementary service that are requested by the UE, ensuring good user experience, and avoiding a technical problem that the UE cannot be connected by using the VoLTE service and processing time is wasted.

BRIEF DESCRIPTION OF DRAWINGS

To describe the technical solutions in the embodiments of this disclosure more clearly, the following briefly describes the accompanying drawings required for describing the embodiments.

DESCRIPTION OF EMBODIMENTS

In the specification, claims, and accompanying drawings of this disclosure, the terms "first", "second", "third", "fourth", and the like are intended to distinguish between different objects but do not indicate a particular order. In addition, the terms "include", "comprise", or any variants thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
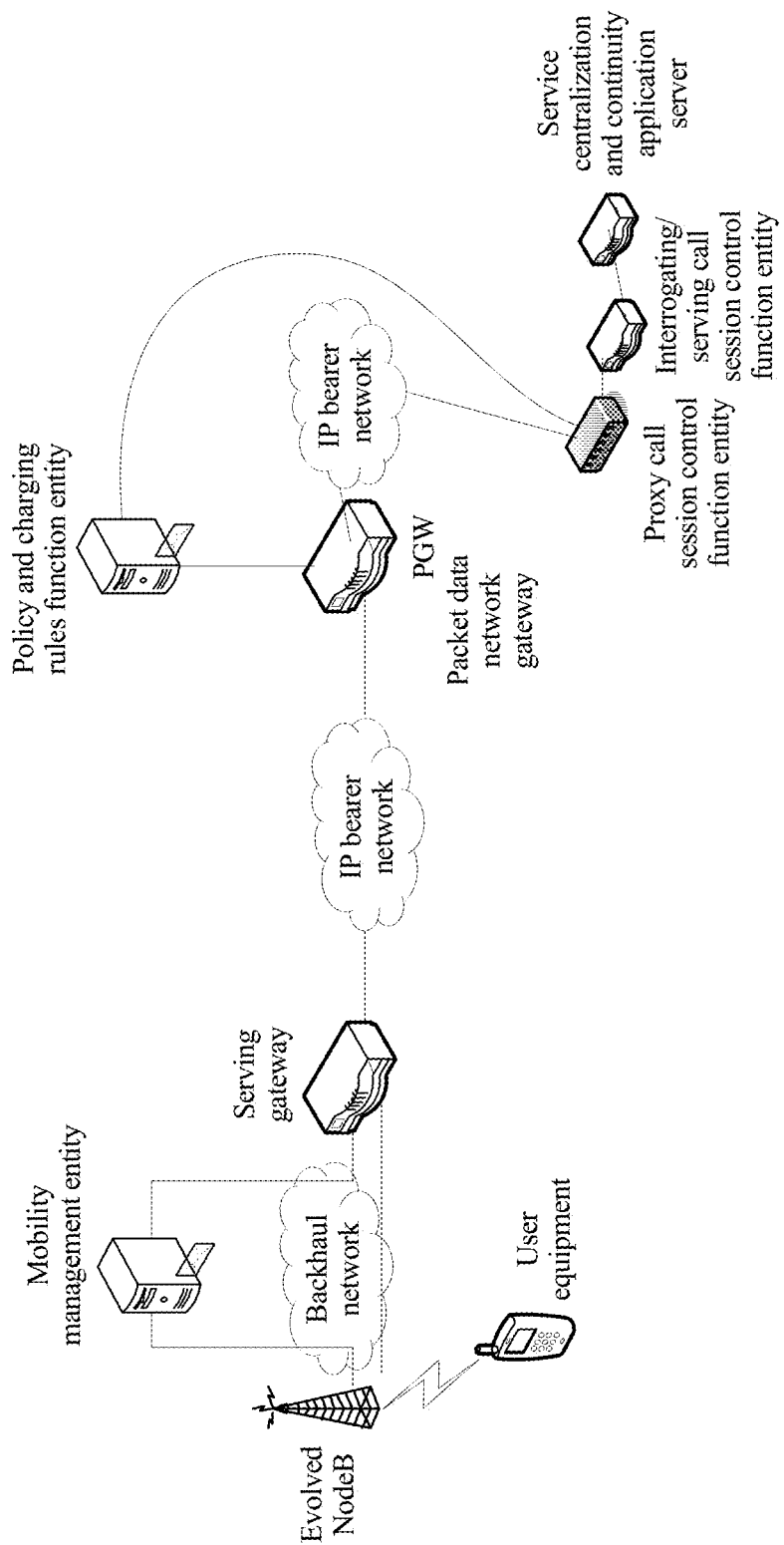
FIG. 1 is a schematic architectural diagram of a communications network according to an embodiment of this disclosure.

Referring to FIG. 1, FIG. 1 is a schematic architectural diagram of a communications network according to an embodiment of this disclosure. An evolved NodeB (eNB, Evolved NodeB) may set up a communications connection to user equipment by using a radio link. A core network device of an LTE network of an example architecture shown in FIG. 1 includes a mobility management entity (MME), a serving gateway (SGW), a packet data network gateway (PGW), a policy and charging rules function entity, and the like. The core network device may be responsible for connecting a VoLTE service of the UE to an Internet Protocol multimedia subsystem (IMS) network, and responsible for transmitting VoLTE call-related signaling between the UE and the IMS network. In addition, the core network device may be responsible for setting up a dedicated bearer (for example, quality of service class identifier (QCI)=1) for transmitting related user plane data of the VoLTE service (media data).

FIG. 1 further includes IMS core network devices, which are specifically: a proxy call session control function (P-CSCF) entity, an interrogating/serving call session control function (I/S-CSCF) entity, and a service centralization and continuity application server (SCC AS).

A P-CSCF (which may be classified into a P-CSCF of an originating side and a P-CSCF of a terminating side) is a first contact point for the UE to access the IMS network in a VoLTE service process. The P-CSCF may serve as an agent of all VoLTE-related signaling and complete routing control. In a VoLTE call process, the P-CSCF may further be responsible for sending a related control message or the like to the policy and charging rules function (PCRF) entity. When the UE is in a roaming state, the P-CSCF generally refers to a P-CSCF of a visited public land mobile network (VPLMN) in which the UE is located.

An I/S-CSCF (which may be classified into an I/S-CSCF of an originating side and an I/S-CSCF of a terminating side) is a service switching center of the IMS network. The I/S-CSCF may be mainly responsible for receiving and processing a registration request, user management, session control, service switching, service control, Session Initiation Protocol (SIP) message processing, charging, and the like that are of the UE. The I/S-CSCF may further trigger, for example, a SIP request to a corresponding domain selection service device according to a trigger principle of an application.

The SCC AS may be classified into an SCC AS of an originating side and an SCC AS of a terminating side. The SCC AS is a generic term for application layer servers in the IMS network, and is responsible for providing various application layer services. In the embodiments of this disclosure, the SCC AS may include a terminating access domain selection (T-ADS) function. Therefore, the SCC AS may be used as a terminating domain selection device to connect a terminating voice session to a corresponding domain (for example, a CS domain or a PS domain). The terminating domain selection device may determine whether to initiate a VoLTE call (corresponding to the PS domain) or a conventional circuit switched domain call (corresponding to the CS domain) to the UE. Optionally, the SCC AS may not include the terminating access domain selection function. In this case, the terminating domain selection device may be separately disposed to connect the terminating voice session to a corresponding domain (for example, the CS domain or the PS domain). Preferably, in the embodiments of this disclosure, the SCC AS may include the terminating access domain selection function.

The embodiments of this disclosure may be applied to a network such as the LTE network.

In the embodiments of this disclosure, the user equipment may be a wireless terminal or may be a wired terminal, for example, may be a mobile phone, a computer, a tablet computer, a personal digital assistant (PDA), a mobile Internet device (MID), a wearable device, an e-book reader, and the like.

Some technical solutions in the embodiments of this disclosure may be specifically implemented based on the example communications network architecture shown in FIG. 1 or a variant of the example communications network architecture.

Embodiment 1

Embodiment 1 of this disclosure is described from a perspective of an IMS core network device. The IMS core network device may be an interrogating/serving call session control function I/S-CSCF, a service centralization and continuity application server SCC AS, or a proxy-call session control function P-CSCF.

Figure 2:
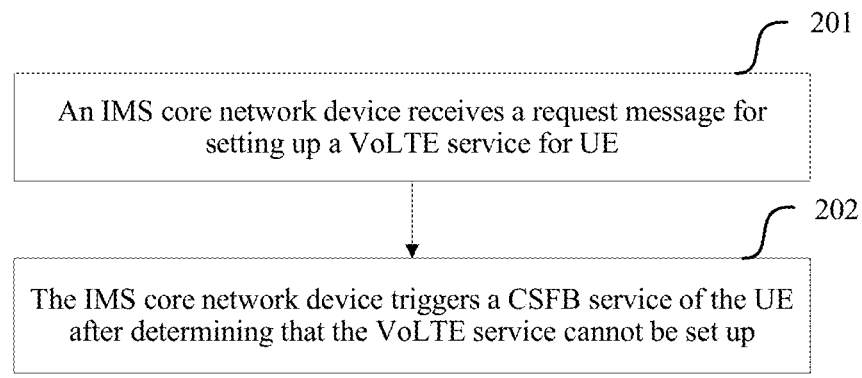
FIG. 2 is a schematic flowchart of a service processing method according to Embodiment 1 of this disclosure.

FIG. 2 is a schematic flowchart of a service processing method according to Embodiment 1 of this disclosure. As shown in FIG. 2, the method includes:

Step 201: The IMS core network device receives a request message for setting up a VoLTE service for UE.

Step 202: The IMS core network device triggers a CSFB service of the UE after determining that the VoLTE service cannot be set up.

Specifically, in step 202, the IMS core network device determines that the VoLTE cannot be set up may include: the IMS core network device obtains at least one supplementary service associated with the VoLTE service, and determines that the at least one supplementary service is unavailable. The IMS core network device may obtain the at least one supplementary service associated with the VoLTE service in the following manners: Manner (1): The IMS core network device obtains, based on subscription information of the UE, the at least one supplementary service associated with the VoLTE service; and Manner (2): The IMS core network device obtains, from a supplementary service setup request message sent by the UE, the at least one supplementary service associated with the VoLTE service.

Alternatively, the IMS core network device determines that the VoLTE cannot be set up may include: the IMS core network device determines that a service network in which the UE is currently located does not support the VoLTE service. Specifically, the following is included: the IMS core network device determines that a VoLTE service function is not activated in a VPLMN in which the UE is located or no VoLTE service roaming agreement is signed between the VPLMN in which the UE is located and a home public land mobile network (HPLMN). The IMS core network device may determine that the VoLTE service function is not activated in the VPLMN in which the UE is located by determining existence of at least one of the following cases:

the VPLMN is not on a whitelist of networks in which a VoLTE service function is activated;

the VPLMN is on a blacklist of networks in which the VoLTE service function is not activated;

no VoLTE service roaming agreement is signed between the VPLMN and the HPLMN;

a P-CSCF of the VPLMN is not on a whitelist of networks that support the VoLTE service function; and the P-CSCF of the VPLMN is on a blacklist of networks that do not support the VoLTE service function.

In step 202, before triggering the CSFB service of the UE, the IMS core network device needs to determine that the UE has registered with a circuit switched domain. Specifically, the IMS core network device obtains, from a home subscriber server HSS or a home location register HLR, information registered by the UE with a circuit switched CS network, and determines, based on the information registered by the UE with the CS network, whether the UE has registered with the circuit switched domain. For example, the IMS core network device may query the HSS/HLR whether the UE has registered with the CS network. after determining, based on location information that is of the CS network corresponding to the UE and that is internally recorded, that the UE has registered with the CS network, the home subscriber server (HSS)/home location register (HLR) responds to the IMS core network device with a message indicating that the UE has registered with the CS network; or the IMS core network device directly determines, based on the location information that is of the CS network corresponding to the UE and that is obtained from the HSS/HLR, that the UE has registered with the CS network. The location information that is of the CS network corresponding to the UE and that is recorded in the HSS/HLR may be specifically a mobile switching center (MSC) number/name, a visitor location register (VLR) number/name, an MSC area, or the like.

The IMS core network device may trigger the CSFB service of the UE only after determining that the UE has registered with the circuit switched domain. When the IMS core network device determines that the UE has not registered with the circuit switched domain, even if the IMS core network device determines that the VoLTE service cannot be set up, the IMS core network device may not trigger the CSFB service of the UE. In this manner, the CSFB service of the UE can be triggered only after the UE has registered with the circuit switched domain, so as to ensure that the CSFB service is successfully triggered. If the UE has not registered with the circuit switched domain, the CSFB service does not need to be triggered, so that a redundant trigger procedure is avoided, thereby saving processing resources.

In this embodiment of this disclosure, the UE may be originating UE of the VoLTE service; and correspondingly, the IMS core network device is an I/S-CSCF of an originating side, an SCC AS of an originating side, or a P-CSCF of an originating side. Alternatively, the UE may be terminating UE; and correspondingly, the IMS core network device is an I/S-CSCF of a terminating side, an SCC AS of a terminating side, or a P-CSCF of a terminating side.

In step 202, if the UE is the originating UE of the VoLTE service, the triggering, by the IMS core network device, a CSFB service of the UE includes: sending, by the IMS core network device, a first message to the originating UE, where the first message is used to trigger the originating UE to initiate a originating circuit switched fallback CSFB service. Preferably, the first message includes a first cause value, and the first cause value is used to notify the originating UE of a specific reason why the VoLTE service is unavailable. For example, the specific reason may be as follows: Unavailability of a supplementary service causes unavailability of the VoLTE service, or that a VoLTE function is not activated in a network in which the UE is located causes unavailability of the VoLTE service. The first cause value is sent to the originating UE, so that the originating UE can perform recording, thereby providing a basis for a subsequent process such as statistical analysis.

In step 202, if the UE is the terminating UE of the VoLTE service, the triggering, by the IMS core network device, a CSFB service of the UE includes: sending, by the IMS core network device, a second message to a terminating domain selection device, where the second message is used to instruct the terminating domain selection device to trigger a terminating circuit switched fallback CSFB service of the terminating UE. Optionally, the second message includes a second cause value, and the second cause value is used to notify the terminating domain selection device of a specific reason why the VoLTE service is unavailable. For example, the specific reason may be as follows: Unavailability of a supplementary service causes unavailability of the VoLTE service, or that a VoLTE function is not activated in a network in which the UE is located causes unavailability of the VoLTE service. The second cause value is sent to the terminating domain selection device, so that the terminating domain selection device can perform recording, thereby providing a basis for a subsequent process such as statistical analysis.

It may be learned that, in this embodiment of this disclosure, in an example in which the UE is originating UE, after receiving a VoLTE service request message sent by the originating UE, an IMS core network device of an originating side notifies the originating UE that the VoLTE service is unavailable if the IMS core network device of the originating side determines that the VoLTE service cannot be set up. Compared with a prior-art process, after initiating a VoLTE service request, the originating UE may automatically trigger a CSFB originating process if the originating UE receives a response message that the VoLTE service is unavailable and that is sent by the IMS core network device of the originating side corresponding to the originating UE, so as to set up a voice call service in the CS domain, thereby effectively avoiding a problem that a VoLTE call may fail because a user who subscribes to the VoLTE service roams to a service network in which the VoLTE function is not activated. This improves stability of the VoLTE service of the user. In addition, a supplementary service that the user cannot implement in an IMS network may be implemented in the CS network. This improves user service experience. For example, currently, there still exists a problem that IMS networks set up by many operators only provide a VoLTE voice service, and many supplementary services that can be provided by an original conventional CS network cannot be supported in the IMS network. For another example, some operators do not fully activate the VoLTE function to the users, and activate the VoLTE function in only a few subnetwork, and this status may last for a long time. Therefore, in these scenarios, the UE may not successfully set up the VoLTE service. Consequently, stability of a call service is affected, or user service experience is not ideal even if the VoLTE service can be set up. In this embodiment of this disclosure, in the foregoing scenarios, the UE may fall back to the CS network to initiate a voice call, thereby effectively improving stability of a call service, and improving user experience.

The following describes the service processing method in this embodiment of this disclosure in detail with reference to specific embodiments.

Embodiment 2

In Embodiment 2 of this disclosure, the UE is originating UE of a VoLTE service; and correspondingly, an IMS core network device is an I/S-CSCF of an originating side, an SCC AS of an originating side, or a P-CSCF of an originating side.

Figure 3:
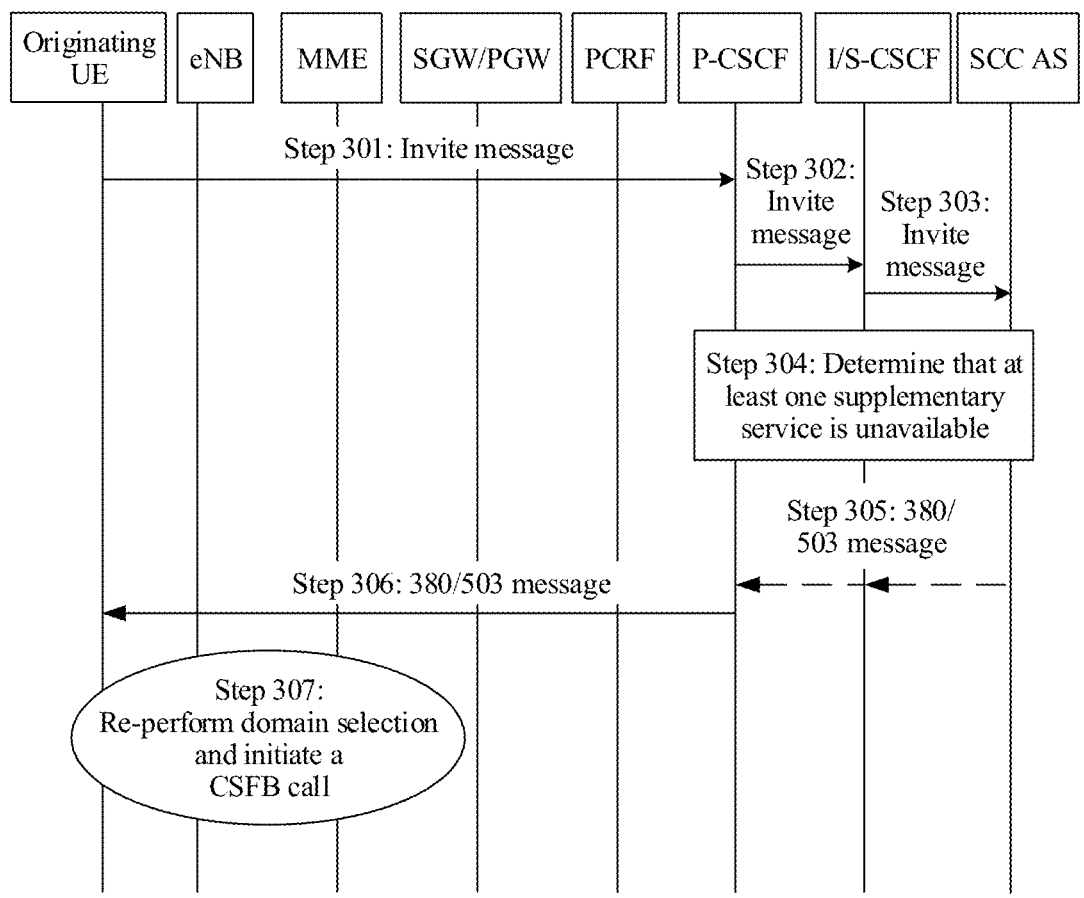
FIG. 3 is a schematic flowchart of a service processing method according to Embodiment 2 of this disclosure.

FIG. 3 is a schematic flowchart of a service processing method according to Embodiment 2 of this disclosure. As shown in FIG. 3, the method includes the following steps.

Step 301: The originating UE initiates setup of a VoLTE service by sending an invite message. The P-CSCF of the originating side receives the invite message from the originating UE, and after receiving the invite message, triggers the P-CSCF of the originating side to set up an originating IMS session for the originating UE.

Steps 302 and 303: The P-CSCF of the originating side sends the invite message to a subsequent IMS node (for example, an IMS node may be an I/S-CSCF or an SCC AS).

Step 304: The SCC AS of the originating side obtains at least one supplementary service associated with the VoLTE service, and determines that the VoLTE service cannot be set up after determining that the at least one supplementary service is unavailable.

In this embodiment of this disclosure, a supplementary service may be triggered by a network side based on subscription information of the UE. For example, the SCC AS of the originating side obtains subscription data of the originating UE from an HSS. The subscription data of the originating UE includes information about a supplementary service (for example, a Ring Back Tone and call transfer) that needs to be provided by the network side associated with a VoLTE call service to the originating UE. The SCC AS of the originating side determines, based on the information about the supplementary service, whether one or some supplementary services in the information cannot be supported by an IMS network.

Optionally, the supplementary service may be actively initiated by a UE side. For example, in a process in which the originating UE initiates the invite message to request to set up a VoLTE call (specifically, it may be that the originating UE has sent the invite message to request the VoLTE call, but has not received an alerting response), the originating UE actively requests, based on a user instruction, the network side to cooperate to perform some supplementary services (LCS). In this case, the originating UE re-sends the invite message (that is, setup a request message for a supplementary service), and the re-sent invite message is used to request an IMS network side to perform the supplementary service. The SCC AS of the originating side determines, based on the invite message re-sent by the originating UE, whether the requested supplementary service in the invite message can be supported by the IMS network. For example, if the SCC AS of the originating side determines that a media request corresponding to one or some supplementary services described in a Session Description Protocol (SDP) offer in the invite message re-sent by the originating UE cannot be satisfied, the SCC AS of the originating side may determine that the supplementary service is not supported, and the VoLTE service cannot be set up. It should be noted that the operation for determining whether the VoLTE service can be set up in step 304 may be performed by the I/S-CSCF of the originating side; and a specific execution process is similar to the execution process of the SCC AS, and details are not described herein again.

Step 305: The SCC AS of the originating side returns a 380/503 response message to the I/S-CSCF of the originating side, and the I/S-CSCF of the originating side delivers the 380/503 response message to the P-CSCF of the originating side.

Optionally, before step 305, the SCC AS of the originating side further needs to determine that the originating UE has registered with a circuit switched domain. For a specific determining method, refer to Embodiment 1. That is, the SCC AS of the originating side performs step 305 and subsequent operations only when determining that the originating UE has registered with the circuit switched domain; or if it is determined that the originating UE has not registered with the circuit switched domain, step 305 and the subsequent operations are not performed.

Step 306: The P-CSCF of the originating side delivers the 380/503 response message to the originating UE.

In this embodiment of this disclosure, the 380/503 response message is used to indicate that a current VoLTE service is unavailable. The 380/503 response message is merely an example for description, and may alternatively be a response message of another name. Specifically, the P-CSCF of the originating side may determine, based on an operator's policy and UE configuration information, to send which response message. To support VoLTE roaming, the IMS core network device may deliver different response messages based on different VPLMNs in which the originating UE is located, for example, send the 380 message to UE in a network A, and send the 503 message to UE in a network B.

Optionally, before step 306, a P-CSCF of a terminating side further needs to determine that terminating UE corresponding to the originating UE is in a pre-alerting state. That is, the P-CSCF of the terminating side performs step 306 and a subsequent operation only when determining that the terminating UE corresponding to the originating UE is in the pre-alerting state; or if it is determined that the terminating UE corresponding to the originating UE is not in the pre-alerting state, step 306 and the subsequent operation are not performed. This achieves user unawareness.

Step 307: After receiving the 380/503 message sent by the P-CSCF of the originating side, the originating UE may re-perform domain selection and initiate a CSFB call. The UE side and the network side cooperate to implement a CSFB procedure, and finally set up a voice call in the CS domain. If a supplementary service exists, the supplementary service associated with a voice service is re-set up in the CS domain.

That the supplementary service associated with a voice service is re-set up in the CS domain may be that a CS domain core network device learns, based on the subscription data, supplementary services that are associated with the voice service and that need to be performed. In a process of setting up a CS voice call, the CS domain core network device triggers execution of the supplementary services. Alternatively, that the supplementary service associated with a voice service is re-set up in the CS domain may be that after learning that the supplementary service requested in an LTE network fails and falls back to the CS domain by performing CSFB, the originating UE may perform supplementary services associated with the VoLTE service in the CS domain while setting up the voice call.

It should be noted that, after step 301, the P-CSCF of the originating side may determine whether the VoLTE service can be set up; and a determining method is similar to step 304, and details are not described herein again. If the P-CSCF of the originating side determines that the VoLTE service cannot be set up, the P-CSCF may directly perform step 306, and skip step 302 to step 305. Optionally, before step 306, the P-CSCF of the originating side further needs to determine that the originating UE has registered with the circuit switched domain. For a specific determining method, refer to Embodiment 1. That is, the P-CSCF of the originating side performs step 306 and a subsequent operation only when determining that the originating UE has registered with the circuit switched domain; or if it is determined that the originating UE has not registered with the circuit switched domain, step 306 and the subsequent operation are not performed.

In the foregoing process, in a scenario in which the originating UE initiates supplementary services associated with the VoLTE voice service, if the IMS core network device determines that at least one of the supplementary services cannot be supported, the IMS core network device rejects a VoLTE call request initiated by the originating UE, so that the VoLTE call is converted into the CSFB call. The technical solution in this embodiment of this disclosure helps ensure that the VoLTE service call can be converted into the CSFB call when the network side temporarily does not support the VoLTE call that is initiated by the UE and that includes some special supplementary services, and at least ensures a voice service requested by the UE. In addition, the UE is unaware of this, thereby ensuring good user experience.

Embodiment 3

In Embodiment 3 of this disclosure, the UE may be terminating UE of a VoLTE service; and correspondingly, an IMS core network device is an I/S-CSCF of a terminating side, an SCC AS of a terminating side, or a P-CSCF of a terminating side.

Figure 4:
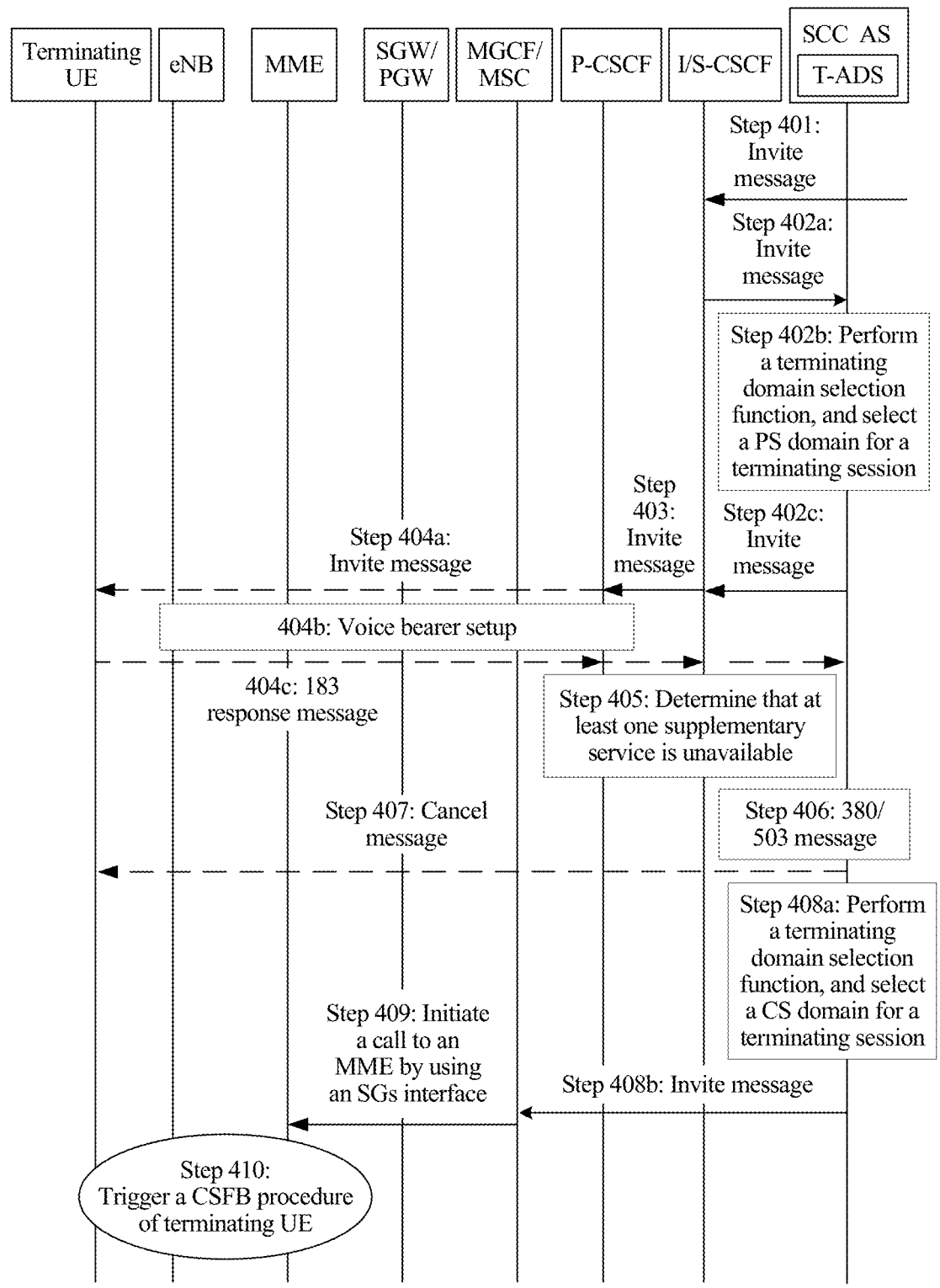
FIG. 4 is a schematic flowchart of a service processing method according to Embodiment 3 of this disclosure.

FIG. 4 is a schematic flowchart of a service processing method according to Embodiment 3 of this disclosure. As shown in FIG. 4, the method includes the following steps.

Step 401: The I/S-CSCF of the terminating side receives an invite message sent to the terminating UE, and after receiving the invite message, triggers the I/S-CSCF of the terminating side to set up a terminating IMS session for the terminating UE.

Step 402a: The I/S-CSCF of the terminating side sends the invite message to the SCC AS of the terminating side.

Step 402b: The SCC AS of the terminating side performs a terminating domain selection function, and selects a PS domain for the terminating session.

Step 402c: The SCC AS of the terminating side sends the invite message to the I/S-CSCF of the terminating side.

Step 403: The I/S-CSCF of the terminating side sends the invite message to the P-CSCF of the terminating side.

Steps 404a to 404c: The P-CSCF of the terminating side forwards the invite message to the terminating UE (step 404a), the terminating UE returns a 183 response message (step 404c), and subsequently, the 183 response message is forwarded by the P-CSCF to the I/S-CSCF of the terminating side and the SCC AS of the terminating side. In this process, a network side may further trigger a voice dedicated bearer (QCI=1) setup process (step 404b).

Step 405: The SCC AS of the terminating side obtains at least one supplementary service associated with the VoLTE service, and determines that the VoLTE service cannot be set up after determining that the at least one supplementary service is unavailable.

In this embodiment of this disclosure, a supplementary service may be triggered by the network side based on subscription information of the UE. For example, the SCC AS of the terminating side obtains subscription data of the terminating UE from an HSS. The subscription data of the terminating UE includes information about a supplementary service (for example, a Ring Back Tone or call transfer) that needs to be provided by the network side associated with a VoLTE call service to the terminating UE. The SCC AS of the terminating side determines, based on the information about the supplementary service, whether one or some supplementary services cannot be supported by an IMS network.

Optionally, the supplementary service may be actively initiated by a UE side. For example, in a process in which the terminating UE receives the invite message for requesting to set up a VoLTE call, in this case, the terminating UE actively sends the invite message (that is, setup a request message for a supplementary service), and the sent invite message is used to request an IMS network side to perform the supplementary service. The SCC AS of the terminating side determines, based on the invite message sent by the terminating UE, whether the requested supplementary service in the invite message can be supported by the IMS network. For example, if the SCC AS of the terminating side determines that a media request corresponding to one or some supplementary services described in an SDP offer in the invite message sent by the terminating UE cannot be satisfied, the SCC AS of the terminating side may determine that the supplementary service is not supported, and the VoLTE service cannot be set up.

It should be noted that the operation for determining whether the VoLTE service can be set up in step 405 may be performed by the I/S-CSCF of the terminating side after receiving the invite message in step 401; and a specific execution process is similar to the execution process of the SCC AS, and details are not described herein again.

Step 406: The SCC AS of the terminating side returns a 380/503 response message to a terminating domain selection device. Optionally, the response message sent by the SCC AS of the terminating side to the terminating domain selection device may be another response message, and the 380 and 503 response messages are merely used as an example for description. A specific sent response message may be set based on configuration information of an operator and the like.

It should be noted that, if the I/S-CSCF of the terminating side performs the determining operation of step 405, after determining that the VoLTE service cannot be set up, the I/S-CSCF of the terminating side sends the 380/503 response message to the terminating domain selection device.

Optionally, before step 406, the SCC AS of the terminating side further needs to determine that the terminating UE has registered with a circuit switched domain. For a specific determining method, refer to Embodiment 1. That is, the SCC AS of the terminating side performs step 406 and subsequent operations only when determining that the terminating UE has registered with the circuit switched domain; or if it is determined that the terminating UE has not registered with the circuit switched domain, step 406 and the subsequent operations are not performed.

Optionally, before step 406, the P-CSCF of the terminating side further needs to determine that terminating UE is in a pre-alerting state. That is, the P-CSCF of the terminating side performs step 406 and the subsequent operations only when determining that the terminating UE is in the pre-alerting state; or if it is determined that the terminating UE is not in the pre-alerting state, step 406 and the subsequent operations are not performed. This achieves user unawareness.

Step 407: If step S404 is performed, after determining that the VoLTE service cannot be set up, the SCC AS of the terminating side sends a cancel message to the terminating UE, so as to cancel a requested session related to the VoLTE service. An order in which S406 and S407 are performed is not limited.

It should be noted that, if the I/S-CSCF of the terminating side performs the operation of step 405, S407 should also be performed by the I/S-CSCF of the terminating side.

Steps 408a and 408b: The terminating domain selection device reselects a CS domain for the terminating session, and initiates a call to a CS domain call control device (for example, an MSC) through a device such as the I/S-CSCF of the terminating side.

Step 409: The CS domain call control device (for example, the MSC) initiates a call to an MME through an SGs interface.

Step 410: The MME triggers a CSFB procedure of the terminating UE. For a detailed procedure, refer to related descriptions in 3GPP TS 23.272, and details are not described herein. Based on the CSFB procedure of the terminating UE, the terminating UE finally sets up a voice session in the CS domain. If a supplementary service exists, the supplementary service associated with a voice service is re-set up in the CS domain.

It should be noted that after step 403, the P-CSCF of the terminating side may perform the operation of step 405; and an operation manner is similar to that of step 405, and details are not described herein again. If it is determined that the VoLTE service cannot be set up, the P-CSCF of the terminating side directly performs step 406, and skips step 404 and step 407. Optionally, before step 406, the P-CSCF of the terminating side further needs to determine that the terminating UE has registered with a circuit switched domain. For a specific determining method, refer to Embodiment 1. That is, the P-CSCF of the terminating side performs step 406 and the subsequent operations only when determining that the UE has registered with the circuit switched domain; or if it is determined that the UE has not registered with the circuit switched domain, step 406 and the subsequent operations are not performed.

In the foregoing process, in a scenario in which the UE of the terminating side initiates supplementary services associated with the VoLTE voice service, if an IMS core network device determines that at least one of the supplementary services cannot be supported, the IMS core network device reselects the CS domain for the call, so as to trigger the CSFB call procedure of the terminating UE. The technical solution in this embodiment of this disclosure helps ensure that the VoLTE service can be converted into a CSFB service when the network side temporarily does not support the VoLTE service that is of the UE and that includes some special supplementary services, and at least ensures a voice service requested by the UE. In addition, the UE is unaware of this, thereby ensuring good user experience.

Embodiment 4

In Embodiment 4 of this disclosure, the UE may be originating UE of a VoLTE service; and correspondingly, an IMS core network device is an S-CSCF of an originating side, an SCC AS of an originating side, or a P-CSCF of an originating side.

Figure 5:
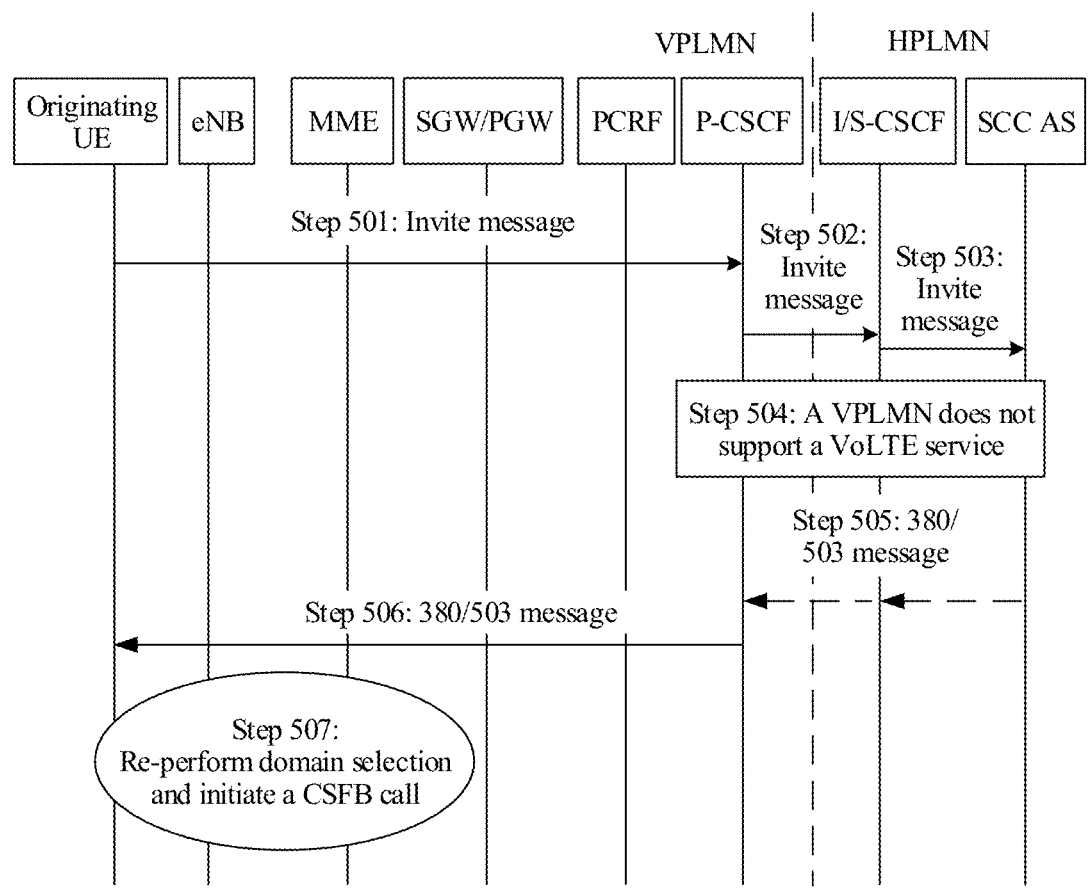
FIG. 5 is a schematic flowchart of a service processing method according to Embodiment 4 of this disclosure.

FIG. 5 is a schematic flowchart of a service processing method according to Embodiment 4 of this disclosure. As shown in FIG. 5, the method includes the following steps.

Step 501: The originating UE initiates setup of a VoLTE service by sending an invite message. The P-CSCF of the originating side receives the invite message from the originating UE, and after receiving the invite message, triggers the P-CSCF of the originating side to set up an originating IMS session for the originating UE.

Steps 502 and 503: The P-CSCF of the originating side sends the invite message to a subsequent IMS node (for example, an IMS node may be an S-CSCF or an SCC AS).

Step 504: After determining that a service network in which the UE is currently located does not support the VoLTE service, the SCC AS of the originating side determines that the VoLTE service cannot be set up.

In this embodiment of this disclosure, the SCC AS of the originating side determines that a service network in which the UE is currently located does not support the VoLTE service includes: a VoLTE service function is not activated in a VPLMN in which the UE is located or no VoLTE service roaming agreement is signed between the VPLMN in which the UE is located and a home public land mobile network HPLMN.

Specifically, the SCC AS of the originating side may obtain an address of the P-CSCF of the originating side from the received invite message, and learns, based on the address of the P-CSCF of the originating side, a VPLMN to which the P-CSCF of the originating side belongs. If the SCC AS of the originating side determines that the VPLMN is not on a whitelist of networks in which a VoLTE function is activated, the VPLMN is on a blacklist of networks in which the VoLTE function is not activated, or no VoLTE service roaming agreement is signed between the VPLMN and the HPLMN, the SCC AS of the originating side determines that the service network in which the UE is currently located does not support the VoLTE service.

Alternatively, the SCC AS of the originating side may obtain an address of the P-CSCF of the originating side from the received invite message, and directly performs determining based on the address of the P-CSCF of the originating side. If the SCC AS of the originating side determines that the P-CSCF of the originating side is not on a whitelist of networks that support the VoLTE service or the P-CSCF of the originating side is on a blacklist of networks that do not support the VoLTE service, the SCC AS of the originating side determines that the network in which the SCC AS of the originating side is located (that is, the VPLMN) does not support the VoLTE service of the HPLMN.

It should be noted that the operation for determining whether the VoLTE service can be set up in step 504 may be performed by the S-CSCF of the originating side; and a specific execution process is similar to the execution process of the SCC AS, and details are not described herein again.

Step 505: The SCC AS of the originating side returns a 380/503 response message to the S-CSCF of the originating side, and the S-CSCF of the originating side delivers the 380/503 response message to the P-CSCF of the originating side.

Optionally, before step 505, the SCC AS of the originating side further needs to determine that the originating UE has registered with a circuit switched domain. For a specific determining method, refer to Embodiment 1. That is, the SCC AS of the originating side performs step 505 and subsequent operations only when determining that the originating UE has registered with the circuit switched domain; or if it is determined that the originating UE has not registered with the circuit switched domain, step 505 and the subsequent operations are not performed.

Step 506: The P-CSCF of the originating side delivers the 380/503 response message to the originating UE.

In this embodiment of this disclosure, the 380/503 response message is used to indicate that a current VoLTE service is unavailable. The 380/503 response message is merely an example for description, and may alternatively be a response message of another name. Specifically, the P-CSCF of the originating side may determine, based on an operator's policy and UE configuration information, to send which response message. To support VoLTE roaming, the IMS core network device may deliver different response messages based on different VPLMNs in which the originating UE is located, for example, send the 380 message to UE in a network A, and send the 503 message to UE in a network B.

Optionally, before step 506, a P-CSCF of a terminating side further needs to determine that terminating UE corresponding to the originating UE is in a pre-alerting state. That is, the P-CSCF of the terminating side performs step 506 and a subsequent operation only when determining that the terminating UE corresponding to the originating UE is in the pre-alerting state; or if it is determined that the terminating UE corresponding to the originating UE is not in the pre-alerting state, step 506 and the subsequent operation are not performed. This achieves user unawareness.

Step 507: After receiving the 380/503 message sent by the P-CSCF of the originating side, the originating UE may re-perform domain selection and initiate a CSFB call. A UE side and a network side cooperate to implement a CSFB procedure, and finally set up a voice call in the CS domain.

It should be noted that, after step 501, the P-CSCF of the originating side may determine whether the VoLTE service can be set up. Specifically, in step 504, the P-CSCF of the originating side needs to determine whether the P-CSCF of the originating side itself supports the VoLTE service, or whether the VPLMN in which the P-CSCF of the originating side is located supports the VoLTE service. If the P-CSCF of the originating side determines that the VoLTE service cannot be set up, the P-CSCF may directly perform step 506, and skip step 502 to step 505. Optionally, before step 506, the P-CSCF of the originating side further needs to determine that the originating UE has registered with the circuit switched domain. For a specific determining method, refer to Embodiment 1. That is, the P-CSCF of the originating side performs step 506 and subsequent operations only when determining that the originating UE has registered with the circuit switched domain; or if it is determined that the originating UE has not registered with the circuit switched domain, step 506 and the subsequent operations are not performed.

In the foregoing process, the IMS core network device determines that the originating UE initiates a VoLTE call in the VPLMN and the VPLMN does not support the VoLTE call procedure. For example, after the IMS core network device determines that the VoLTE function is not activated temporarily in the VPLMN, or no roaming agreement is signed between the VPLMN and an HPLMN in which an IMS is located, the IMS core network device rejects a VoLTE call request initiated by the originating UE, so that the VoLTE call is converted into the CSFB call. The technical solution in this embodiment of this disclosure helps ensure that in a scenario in which the originating UE initiates the VoLTE call in the VPLMN whose VoLTE function is not activated temporarily, the CSFB call can be used to replace a VoLTE service call at an originating voice session setup stage, and ensures a success rate of a call initiated by the UE. In addition, the UE is unaware of this, thereby ensuring good user experience.

Embodiment 5

In Embodiment 5 of this disclosure, the UE may be terminating UE of a VoLTE service; and correspondingly, an IMS core network device is an I/S-CSCF of a terminating side, an SCC AS of a terminating side, or a P-CSCF of a terminating side.

Figure 6:
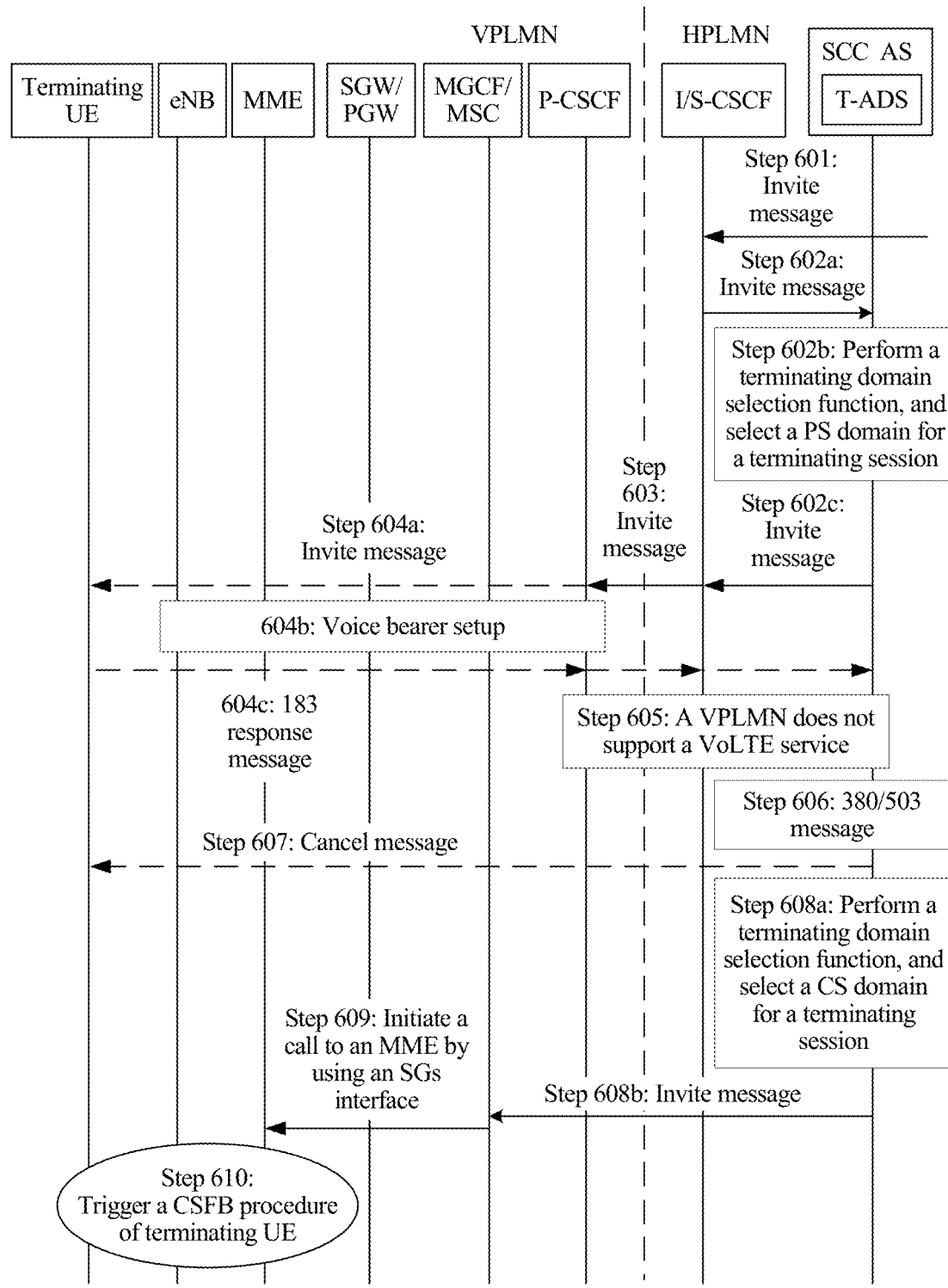
FIG. 6 is a schematic flowchart of a service processing method according to Embodiment 5 of this disclosure.

FIG. 6 is a schematic flowchart of a service processing method according to Embodiment 5 of this disclosure. As shown in FIG. 6, the method includes the following steps.

Step 601: The I/S-CSCF of the terminating side receives an invite message sent to the terminating UE, and after receiving the invite message, triggers the I/S-CSCF of the terminating side to set up a terminating IMS session for the terminating UE.

Step 602a: The I/S-CSCF of the terminating side sends the invite message to the SCC AS of the terminating side.

Step 602b: The SCC AS of the terminating side performs a terminating domain selection function, and selects a PS domain for the terminating session.

Step 602c: The SCC AS of the terminating side sends the invite message to the I/S-CSCF of the terminating side.

Step 603: The I/S-CSCF of the terminating side sends the invite message to the P-CSCF of the terminating side.

Steps 604a to 604c: The P-CSCF of the terminating side forwards the invite message to the terminating UE (step 604a), the terminating UE returns a 183 response message (step 604c), and subsequently, the 183 response message is forwarded by the P-CSCF to the I/S-CSCF of the terminating side and the SCC AS of the terminating side. In this process, a network side may further trigger a voice dedicated bearer (QCI=1) setup process (step 604b).

Step 605: After determining that a service network in which the UE is currently located does not support the VoLTE service, the SCC AS of the terminating side determines that the VoLTE service cannot be set up.

The SCC AS of the terminating side determines that a service network in which the UE is currently located does not support the VoLTE service includes: a VoLTE service function is not activated in a VPLMN in which the UE is located or no VoLTE service roaming agreement is signed between the VPLMN in which the UE is located and an HPLMN.

Specifically, the SCC AS of the terminating side may obtain an address of the P-CSCF of the terminating side in an IMS registration procedure of the terminating UE or obtain an address of the P-CSCF of the terminating side from the 183 response message sent by the terminating UE, and learns, based on the address of the P-CSCF of the terminating side, a VPLMN to which the P-CSCF of the terminating side belongs. If the SCC AS of the terminating side determines that the VPLMN is not on a whitelist of networks in which a VoLTE function is activated, the VPLMN is on a blacklist of networks in which the VoLTE function is not activated, no VoLTE service roaming agreement is signed between the VPLMN and the HPLMN, the P-CSCF of the terminating side is not on a whitelist of networks that support the VoLTE service, or the P-CSCF of the terminating side is on a blacklist of networks that do not support the VoLTE service, the SCC AS of the terminating side determines that the service network in which the UE is currently located does not support the VoLTE service. If the SCC AS of the terminating side obtains the address of the P-CSCF of the terminating side in the IMS registration procedure of the terminating UE, after receiving the invite message in step 602, the SCC AS of the terminating side may use this solution to determine that the VPLMN in which the terminating UE is located does not support the VoLTE service of the HPLMN, that is, directly use this solution to perform the operation of step 605 after step 602, and step 603 and step 604 may be skipped.

The SCC AS of the terminating side may also obtain, from an HSS/HLR, a VPLMN that is currently registered by the terminating UE. Specifically, the VPLMN may be included in an information element such as an MME identifier or an APN. If the SCC AS of the terminating side determines that the VPLMN is not on a whitelist of networks in which a VoLTE function is activated, the VPLMN is on a blacklist of networks in which the VoLTE function is not activated, or no VoLTE service roaming agreement is signed between the VPLMN and the HPLMN, the SCC AS of the terminating side determines that the network in which the P-CSCF of the terminating side is located (that is, the VPLMN) does not support the VoLTE service of the HPLMN. Likewise, in this case, after step 602, the SCC AS of the terminating side directly uses this solution to perform the operation of S605, and step 603 and step 604 may be skipped.

It should be noted that the operation for determining whether the VoLTE service can be set up in step 605 may be performed by the I/S-CSCF of the terminating side after receiving the invite message in step 601; and a specific execution process is similar to the execution process of the SCC AS, and details are not described herein again.

Step 606: The SCC AS of the terminating side returns a 380/503 response message to a terminating domain selection device. Optionally, the response message sent by the SCC AS of the terminating side to the terminating domain selection device may be another response message, and the 380 and 503 response messages are merely used as an example for description. A specific sent response message may be set based on configuration information of an operator and the like.

It should be noted that, if the I/S-CSCF of the terminating side performs the determining operation of step 605, after determining that the VoLTE service cannot be set up, the I/S-CSCF of the terminating side sends the 380/503 response message to the terminating domain selection device.

Optionally, before step 606, the SCC AS of the terminating side further needs to determine that the terminating UE has registered with a circuit switched domain. For a specific determining method, refer to Embodiment 1. That is, the SCC AS of the terminating side performs step 606 and subsequent operations only when determining that the UE has registered with the circuit switched domain; or if it is determined that the UE has not registered with the circuit switched domain, step 606 and the subsequent operations are not performed.

Optionally, before step 606, the P-CSCF of the terminating side further needs to determine that terminating UE is in a pre-alerting state. That is, the P-CSCF of the terminating side performs step 606 and the subsequent operations only when determining that the terminating UE is in the pre-alerting state; or if it is determined that the terminating UE is not in the pre-alerting state, step 606 and the subsequent operations are not performed. This achieves user unawareness.

Step 607: If step S604 is performed, after determining that the VoLTE service cannot be set up, the SCC AS of the terminating side sends a cancel message to the terminating UE, so as to cancel a requested session related to the VoLTE service. An order in which S606 and S607 are performed is not limited.

It should be noted that, if the I/S-CSCF of the terminating side performs the operation of step 605, S607 should also be performed by the I/S-CSCF of the terminating side.

Steps 608a and 608b: The terminating domain selection device reselects a CS domain for the terminating session, and initiates a call to a CS domain call control device (for example, an MSC) through a device such as the I/S-CSCF of the terminating side.

Step 609: The CS domain call control device (for example, the MSC) initiates a call to an MME through an SGs interface.

Step 610: The MME triggers a CSFB procedure of the terminating UE. For a detailed procedure, refer to related descriptions in 3GPP TS 23.272, and details are not described herein. Based on the CSFB procedure of the terminating UE, the terminating UE finally sets up a voice session in the CS domain.

It should be noted that, after step 603, the P-CSCF of the terminating side may perform the operation of step 605. Specifically, in step 605, the P-CSCF of the terminating side needs to determine whether the P-CSCF of the terminating side itself supports the VoLTE service, or whether the VPLMN in which the P-CSCF of the terminating side is located supports the VoLTE service. If it is determined that the VoLTE service cannot be set up, the P-CSCF of the terminating side directly performs step 606, and skips step 604 and step 607.

Optionally, before step 606, the P-CSCF of the terminating side further needs to determine that the terminating UE has registered with a circuit switched domain. For a specific determining method, refer to Embodiment 1. That is, the P-CSCF of the terminating side performs step 606 and subsequent operations only when determining that the UE has registered with the circuit switched domain; or if it is determined that the UE has not registered with the circuit switched domain, step 606 and the subsequent operations are not performed.

In the foregoing process, the IMS core network device determines that the VPLMN in which the terminating UE of the VoLTE service is located does not support a VoLTE call procedure. For example, after determining that the VoLTE function is not activated temporarily in the VPLMN, or no roaming agreement is signed between the VPLMN and an HPLMN in which an IMS is located, the IMS core network device reselects the CS domain for the call, so as to trigger the CSFB call procedure of the terminating UE. The technical solution in this embodiment of this disclosure helps ensure that in a scenario in which the UE that subscribes to the VoLTE service is called in the VPLMN in which the VoLTE function is not activated temporarily, a CSFB terminating call can be used to replace a VoLTE service terminating call at a terminating voice session setup stage, and ensures a terminating success rate of the UE. In addition, the UE is unaware of this, thereby ensuring good user experience.

Embodiment 6

In Embodiment 6 of this disclosure, the UE may be originating UE of a VoLTE service; and correspondingly, an IMS core network device is an S-CSCF of an originating side, an SCC AS of an originating side, or a P-CSCF of an originating side.

Figure 7:
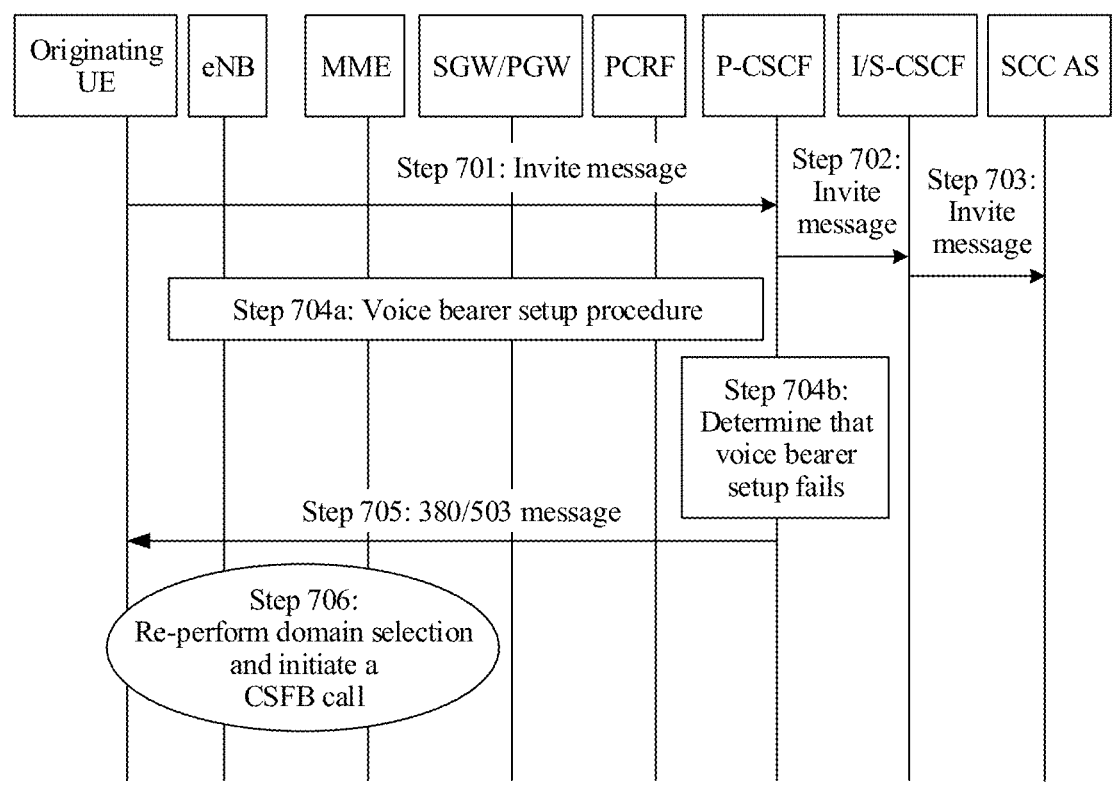
FIG. 7 is a schematic flowchart of a service processing method according to Embodiment 6 of this disclosure.

FIG. 7 is a schematic flowchart of a service processing method according to Embodiment 6 of this disclosure. As shown in FIG. 7, the method includes the following steps.

Step 701: The originating UE initiates setup of a VoLTE service by sending an invite message. The P-CSCF of the originating side receives the invite message from the originating UE, and after receiving the invite message, triggers the P-CSCF of the originating side to set up an originating IMS session for the originating UE.

Steps 702 and 703: The P-CSCF of the originating side sends the invite message to a subsequent IMS node (for example, an IMS node may be an S-CSCF or an SCC AS).

Steps 704a and 704b: The P-CSCF of the originating side determines that a voice dedicated bearer (QCI=1) setup process fails.

For example, in steps 704a and 704b, the P-CSCF of the originating side sends an Authentication Authorization Request (AAR) to an EPC network device (for example, a PCRF), so as to trigger setup of the voice dedicated bearer. The AAR may carry a user identifier of the originating UE, an IMS application layer charging identifier, media description information, and the like. The media description information may include at least one piece of the following information: a classifier identifier, bandwidth requirement description information, media type description information, and a QoS parameter.

After the P-CSCF of the originating side sends the AAR message, if the P-CSCF of the originating side receives a Re-Authentication-Request (RAR) message/Abort-Session-Request (ASR) message sent by the EPC network device (for example, the PCRF), the RAR message/ASR message may carry indication information that is used to indicate insufficiency of a bearer resource or indication information that is used to indicate a resource allocation failure, the P-CSCF of the originating side may determine that the voice dedicated bearer (QCI=1) setup process fails.

Optionally, the P-CSCF of the originating side may further obtain a specific reason value of the voice dedicated bearer (QCI=1) setup failure from the RAR message/ASR message, for example, the cause value may be that the originating UE is in a weak coverage area in a PS domain.

It should be noted that steps 704*a* and 704*b* may also be performed before step 702 or step 703, and the foregoing step number is merely an example representation of a performing order, and a specific performing order is not specifically limited in this embodiment of this disclosure.

Step 705: The P-CSCF of the originating side delivers a 380/503 response message to the originating UE.

Optionally, before step 705, the P-CSCF of the originating side further needs to determine that the originating UE has registered with a circuit switched domain. For a specific determining method, refer to Embodiment 1. That is, the P-CSCF of the originating side performs step 705 and subsequent operations only when determining that the originating UE has registered with the circuit switched domain; or if it is determined that the originating UE has not registered with the circuit switched domain, step 705 and a subsequent operation are not performed.

In this embodiment of this disclosure, the 380/503 response message is used to indicate that a current VoLTE service is unavailable. The 380/503 response message is merely an example for description, and may alternatively be a response message of another name. Specifically, the P-CSCF of the originating side may determine, based on an operator's policy and UE configuration information, to send which response message.

Optionally, before step 705, the P-CSCF of the originating side further needs to determine that terminating UE corresponding to the originating UE is in a pre-alerting state. That is, the P-CSCF of the originating side performs step 705 and subsequent operations only when determining that the terminating UE is in the pre-alerting state; or if it is determined that the terminating UE is not in the pre-alerting state, step 705 and a subsequent operation are not performed. This achieves user unawareness.

Step 706: After receiving the 380/503 message sent by the P-CSCF of the originating side, the originating UE may re-perform domain selection and initiate a CSFB call. A UE side and a network side cooperate to implement a CSFB procedure, and finally set up a voice call in the CS domain.

In the foregoing process, after the IMS core network device determines that a voice dedicated bearer corresponding to an originating VoLTE service cannot be set up in the PS domain, the IMS core network rejects a VoLTE call request initiated by the originating UE, so that a VoLTE call is converted into the CSFB call. The technical solution in this embodiment of this disclosure helps ensure that in a scenario in which the voice dedicated bearer corresponding to the originating VoLTE service cannot be set up, the CSFB call can be used to replace a VoLTE service call at an originating voice session setup stage, and ensures a success rate of a call initiated by the UE. In addition, the UE is unaware of this, thereby ensuring good user experience.

Embodiment 7

In Embodiment 7 of this disclosure, the UE is terminating UE of a VoLTE service; and correspondingly, an IMS core network device is a P-CSCF of a terminating side.

Figure 8:
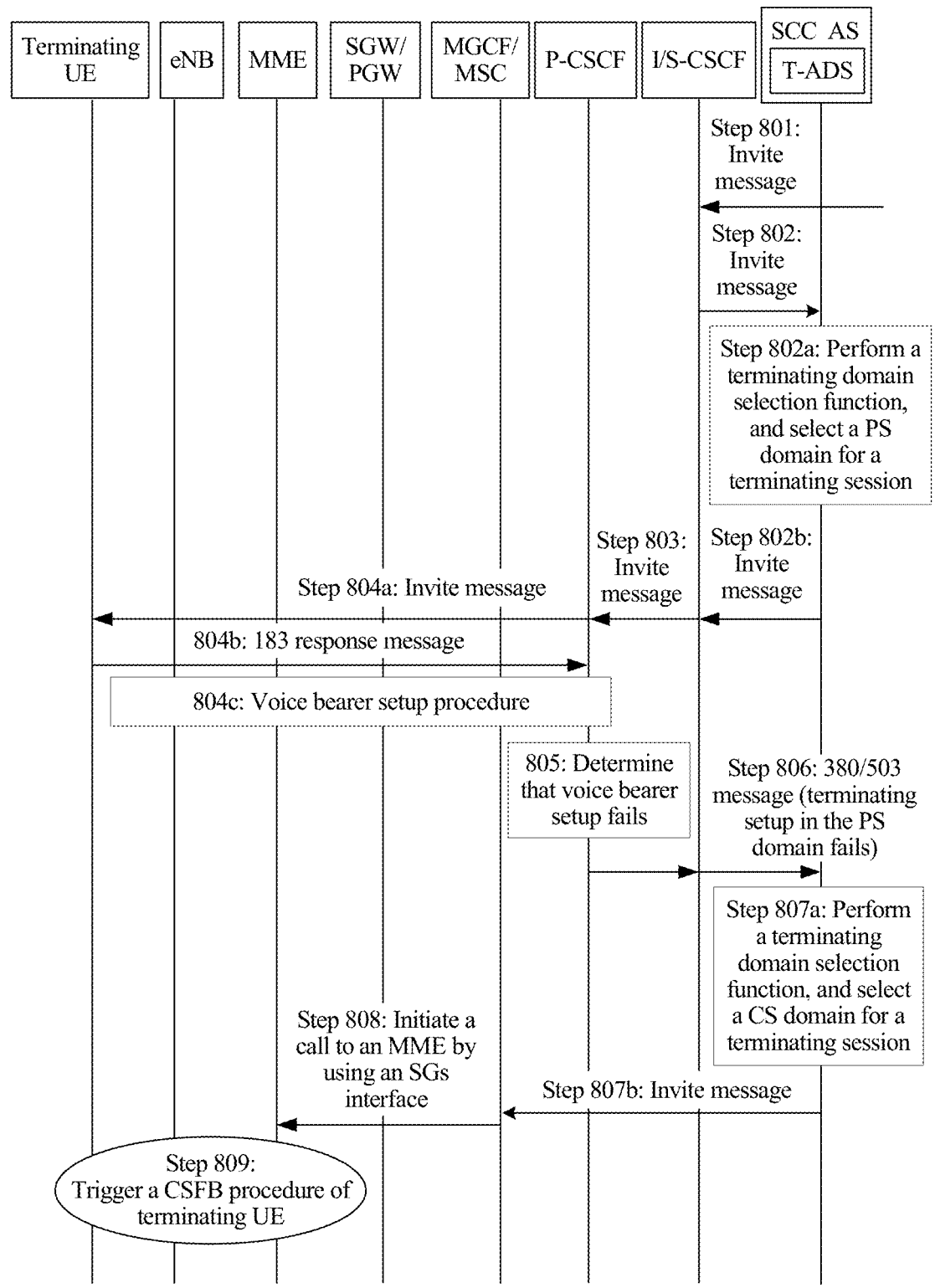
FIG. 8 is a schematic flowchart of a service processing method according to Embodiment 7 of this disclosure.

FIG. 8 is a schematic flowchart of a service processing method according to Embodiment 7 of this disclosure. As shown in FIG. 8, the method includes the following steps.

Step 801: An I/S-CSCF of a terminating side receives an invite message sent to the terminating UE, and after receiving the invite message, triggers the I/S-CSCF of the terminating side to set up a terminating IMS session for the terminating UE.

Step 802: The I/S-CSCF of the terminating side sends the invite message to an SCC AS of a terminating side.

Step 802*a*: The SCC AS of the terminating side performs a terminating domain selection function, and selects a PS domain for the terminating session.

Step 802*b*: The SCC AS of the terminating side sends the invite message to the I/S-CSCF of the terminating side.

Step 803: The I/S-CSCF of the terminating side sends the invite message to the P-CSCF of the terminating side.

Steps 804*a* to 804*c*: The P-CSCF of the terminating side forwards the invite message to the terminating UE (step 804*a*), the terminating UE returns a 183 response message (step 804*b*), and subsequently, the 183 response message is forwarded by the P-CSCF to the I/S-CSCF of the terminating side and the SCC AS of the terminating side. In this process, a network side may further trigger a voice dedicated bearer (QCI=1) setup process (step 804*c*).

Step 805: The P-CSCF of the terminating side determines that the voice dedicated bearer (QCI=1) setup process fails.

For example, in step 804*c*, the P-CSCF of the terminating side sends an Authentication Authorization Request (AAR, Authentication Authorization Request) to an EPC network device (for example, a PCRF), so as to trigger setup of the voice dedicated bearer. The AAR may carry a user identifier of the terminating UE, an IMS application layer charging identifier, media description information, and the like. The media description information may include at least one piece of the following information: a classifier identifier, bandwidth requirement description information, media type description information, and a QoS parameter.

After the P-CSCF of the terminating side sends the AAR message, if the P-CSCF of the terminating side receives a Re-Authentication-Request (RAR) message/Abort-Session-Request (ASR) message sent by the EPC network device (for example, the PCRF), the RAR message/ASR message may carry indication information that is used to indicate insufficiency of a bearer resource or indication information that is used to indicate a resource allocation failure, the P-CSCF of the terminating side may determine that the voice dedicated bearer (QCI=1) setup process fails.

Optionally, the P-CSCF of the terminating side may further obtain a specific reason value of the voice dedicated bearer (QCI=1) setup failure from the RAR message/ASR message, for example, the cause value may be that the terminating UE is in a weak coverage area in the PS domain.

Step 806: The P-CSCF of the terminating side returns a 380/503 response message to the SCC AS of the terminating side, where the 380/503 message includes indication information used to indicate terminating service setup failure in the PS domain.

Optionally, the response message sent by the P-CSCF of the terminating side to the SCC AS of the terminating side may be another response message, and the 380 and 503 response messages are merely used as an example for description. A specific sent response message may be set based on configuration information of an operator and the like.

It should be noted that the P-CSCF of the terminating side may return the 380/503 response message to the SCC AS of the terminating side through the S-CSCF of the terminating side.

Optionally, before step 806, the P-CSCF of the terminating side further needs to determine that the terminating UE has registered with a circuit switched domain. For a specific determining method, refer to Embodiment 1. That is, the P-CSCF of the terminating side performs step 806 and subsequent operations only when determining that the UE has registered with the circuit switched domain; or if it is determined that the UE has not registered with the circuit switched domain, step 806 and the subsequent operations are not performed.

Optionally, before step 806, the P-CSCF of the terminating side further needs to determine that terminating UE is in a pre-alerting state. That is, the P-CSCF of the terminating side performs step 806 and the subsequent operations only when determining that the terminating UE is in the pre-alerting state; or if it is determined that the terminating UE is not in the pre-alerting state, step 806 and the subsequent operations are not performed. This achieves user unawareness.

Steps 807a and 807b: The SCC AS of the terminating side performs the terminating domain selection function, reselects a CS domain for the terminating session, and initiates a call to a CS domain call control device (for example, an MSC) by using a device such as the I/S-CSCF of the terminating side.

Step 808: The CS domain call control device (for example, the MSC) initiates a call to an MME through an SGs interface.

Step 809: The MME triggers a CSFB procedure of the terminating UE. For a detailed procedure, refer to related descriptions in 3GPP TS 23.272, and details are not described herein. Based on the CSFB procedure of the terminating UE, the terminating UE finally sets up a voice session in the CS domain.

In the foregoing process, if a terminating IMS core network device determines that a voice dedicated bearer corresponding to a terminating VoLTE service cannot be set up in the PS domain, the terminating IMS core network device reselects the CS domain for the terminating session, so as to trigger a CSFB call procedure of the terminating UE. The technical solution in this embodiment of this disclosure helps ensure that when the terminating VoLTE service cannot be performed on the terminating UE, a CSFB terminating call can be used to replace a VoLTE service terminating call at a terminating voice session setup stage, and ensures a terminating success rate of the UE. In addition, the UE is unaware of this, thereby ensuring good user experience.

For the foregoing method procedure, this embodiment of this disclosure further provides an IMS core network device. For specific content of the device, refer to the foregoing method embodiments.

Figure 9:
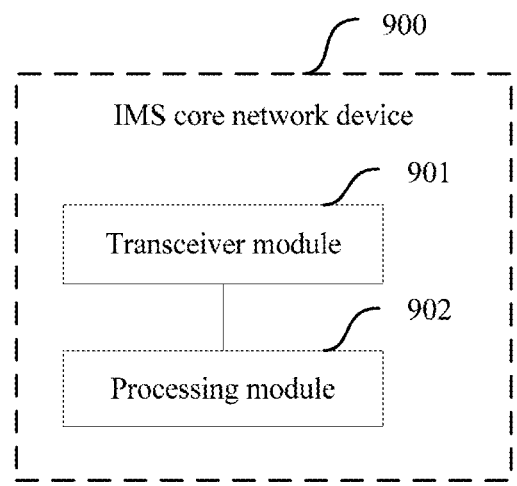
FIG. 9 is a schematic structural diagram of an IMS core network device according to an embodiment of this disclosure.

Based on a same concept, FIG. 9 is a schematic structural diagram of an IMS core network device according to an embodiment of this disclosure. The IMS core network device 900 is configured to perform the foregoing method procedure, and includes:

a transceiver module 901, configured to receive a request message for setting up a Voice over Long Term Evolution VoLTE service for user equipment UE in a packet switched PS domain; and a processing module 902, configured to trigger a circuit switched fallback CSFB service of the UE after determining that the VoLTE service cannot be set up in the PS domain.

Optionally, the processing module 902 is specifically configured to determine that the VoLTE service cannot be set up in the PS domain by determining existence of at least one of the following cases:

at least one supplementary service associated with the VoLTE service is obtained, and it is determined that the at least one supplementary service is unavailable;

it is determined that a service network in which the UE is currently located does not support the VoLTE service; and it is determined that setup of voice bearer of the VoLTE service in the PS domain fails.

Optionally, the processing module 902 obtains the at least one supplementary service associated with the VoLTE service in the following manner:

obtaining, based on subscription information of the UE, the at least one supplementary service associated with the VoLTE service; or obtaining, from a supplementary service setup request message sent by the UE, the at least one supplementary service associated with the VoLTE service.

Optionally, the processing module 902 is specifically configured to determine, in the following manner, that the service network in which the UE is currently located does not support the VoLTE service: determining that a VoLTE service function is not activated in a visited public land mobile network VPLMN in which the UE is located or no VoLTE service roaming agreement is signed between the VPLMN in which the UE is located and a home public land mobile network HPLMN.

Optionally, the processing module 902 is specifically configured to determine that the VoLTE service function is not activated in the visited public land mobile network VPLMN in which the UE is located by determining existence of at least one of the following cases:

the VPLMN is not on a whitelist of networks in which a VoLTE service function is activated;

the VPLMN is on a blacklist of networks in which the VoLTE service function is not activated;

no VoLTE service roaming agreement is signed between the VPLMN and the home public land mobile network HPLMN;

a proxy-call session control function P-CSCF of the VPLMN is not on a whitelist of networks that support the VoLTE service function; and the P-CSCF of the VPLMN is on a blacklist of networks that do not support the VoLTE service function.

Optionally, the processing module 902 is specifically configured to determine, in the following manner, that the setup of voice bearer of the VoLTE service in the PS domain fails:

receiving a Re-Authentication-Request RAR message or an Abort-Session-Request ASR message by using the transceiver module; and after it is determined that the RAR message or the ASR message carries indication information that is used to indicate insufficiency of a bearer resource or indication information that is used to indicate a resource allocation failure, determining that the setup of voice bearer of the VoLTE service in the PS domain fails.

Optionally, the RAR message or the ASR message includes a cause value of the voice bearer setup failure of the VoLTE service.

Optionally, the cause value that is of the voice bearer setup failure of the VoLTE service and that is included in the RAR message or the ASR message is that the UE is in a weak coverage area in the PS domain.

Optionally, before triggering the CSFB service of the UE, the processing module 902 is further configured to:

determine that the UE has registered with a circuit switched domain.

Optionally, the processing module is specifically configured to determine, in the following manner, that the UE has registered with the circuit switched domain:

obtaining, from a home subscriber server HSS or a home location register HLR, information registered by the UE with a circuit switched CS network; and determining, based on the information registered by the UE with the CS network, that the UE has registered with the circuit switched domain.

Optionally, the UE is originating UE of the VoLTE service.

The processing module 902 is specifically configured to trigger the CSFB service of the UE in the following manner:

sending a first message to the originating UE by using the transceiver module 901, where the first message is used to trigger the originating UE to initiate an originating circuit switched fallback CSFB service.

Optionally, the first message includes a first cause value, and the first cause value is used to notify the originating UE of a specific reason why the VoLTE service is unavailable.

Optionally, before sending the first message to the originating UE by using the transceiver module 901, the processing module 902 is further configured to:

determine that terminating UE corresponding to the originating UE is in a pre-alerting state.

Optionally, the IMS core network device is a serving call session control function I/S-CSCF of an originating side, a service centralization and continuity application server SCC AS of an originating side, or a proxy-call session control function P-CSCF of an originating side.

Optionally, the UE is terminating UE of the VoLTE service.

The processing module 902 is specifically configured to trigger the CSFB service of the UE in the following manner:

sending a second message to a terminating domain selection device by using the transceiver module 901, where the second message is used to indicate that terminating service setup in the PS domain fails, so that the terminating domain selection device triggers a terminating circuit switched fallback CSFB service of the terminating UE.

Optionally, the second message includes a second cause value, and the second cause value is used to notify the terminating domain selection device of a specific reason why the terminating setup in the PS domain fails.

Optionally, before sending the second message to the terminating domain selection device by using the transceiver module 901, the processing module 902 is further configured to:

determine that the terminating UE is in a pre-alerting state.

Optionally, the IMS core network device is a serving call session control function I/S-CSCF of a terminating side, a service centralization and continuity application server SCC AS of a terminating side, or a proxy-call session control function P-CSCF of a terminating side.

Optionally, the sending, by the processing module 902, a second message to a terminating domain selection device by using the transceiver module 901 is specifically:

sending, by the processing module 902 of the P-CSCF of the terminating side, the second message to the I/S-CSCF of the terminating side by using the transceiver module 901, so that the I/S-CSCF of the terminating side forwards the second message to the terminating domain selection device.

In this embodiment of this disclosure, the IMS core network device receives the request message for setting up the VoLTE service for the UE. After determining that the VoLTE service cannot be set up, the IMS core network device triggers the CSFB service of the UE, so as to directly trigger the CSFB service of the UE when the VoLTE service cannot be set up, without reattempting to set up the VoLTE service, thereby increasing a call completion rate of the user equipment, ensuring a voice service and a supplementary service that are requested by the UE, ensuring good user experience, and avoiding a technical problem that the UE cannot be connected by using the VoLTE service and processing time is wasted.

Figure 10:
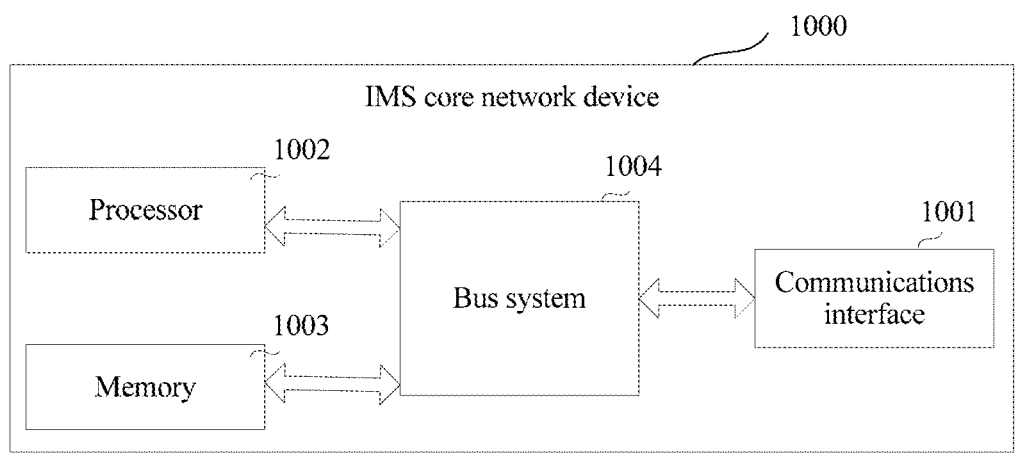
FIG. 10 is a schematic structural diagram of another IMS core network device according to an embodiment of this disclosure.

Based on a same concept, FIG. 10 is a schematic structural diagram of another IMS core network device according to an embodiment of this disclosure. The IMS core network device 1000 is configured to perform the foregoing method procedure, and includes a communications interface 1001, a processor 1002, a memory 1003, and a bus system 1004.

The memory 1003 is configured to store a program. Specifically, the program may include program code, and the program code includes a computer operation instruction. The memory 1003 may be a random access memory (RAM), or may be a non-volatile memory, for example, at least one magnetic disk memory. Only one memory is shown in the figure. Certainly, a plurality of memories may be configured as required. The memory 1003 may alternatively be a memory in the processor 1002.

The memory 1003 stores the following elements: an executable module or a data structure, or a subset thereof or an extended set thereof:

operation instructions: including various operation instructions, which are used to implement various operations;

an operating system: including various system programs, which are configured to implement various basic services and process hardware-based tasks.

The processor 1002 controls an operation of the IMS core network device 1000, and the processor 1002 may also be referred to as a CPU (central processing unit). During specific application, all components of the IMS core network device 1000 are coupled together by using the bus system 1004. The bus system 1004 may further include a power bus, a control bus, a status signal bus, and the like in addition to a data bus. However, for clear description, various types of buses in the figure are marked as the bus system 1004. For ease of illustration, FIG. 10 merely shows an example of the bus system.

The methods disclosed in the foregoing embodiments of this disclosure may be applied to the processor 1002, or may be implemented by the processor 1002. The processor 1002 may be an integrated circuit chip, and has a signal processing capability. In an implementation process, the steps in the foregoing methods may be completed by using an integrated logic circuit of hardware in the processor 1002 or an instruction in a form of software. The processor 1002 may be a general-purpose processor, a digital signal processor (DSP), an application-specific integrated circuit (ASIC), a field programmable gate array (FPGA) or another programmable logic device, a discrete gate or transistor logic device, or a discrete hardware component, and may implement or perform the methods, the steps, and the logical block diagrams disclosed in the embodiments of this disclosure. The general-purpose processor may be a microprocessor, or the processor may be any conventional processor or the like.

The steps of the methods disclosed in the embodiments of this disclosure may be directly performed by a hardware decoding processor, or performed by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 1003. The processor 1002 reads information in the memory 1003, and performs the following steps in combination with hardware of the memory:

receiving, by using the communications interface 1001, a request message for setting up a Voice over Long Term Evolution VoLTE service for user equipment UE in a packet switched PS domain; and triggering a circuit switched fallback CSFB service of the UE after determining that the VoLTE service cannot be set up in the PS domain.

Optionally, the processor 1002 is specifically configured to determine that the VoLTE service cannot be set up in the PS domain by determining existence of at least one of the following cases:

at least one supplementary service associated with the VoLTE service is obtained, and it is determined that the at least one supplementary service is unavailable;

it is determined that a service network in which the UE is currently located does not support the VoLTE service; and it is determined that setup of voice bearer of the VoLTE service in the PS domain fails.

Optionally, the processor 1002 obtains the at least one supplementary service associated with the VoLTE service in the following manner:

obtaining, based on subscription information of the UE, the at least one supplementary service associated with the VoLTE service; or obtaining, from a supplementary service setup request message sent by the UE, the at least one supplementary service associated with the VoLTE service.

Optionally, the processor 1002 is specifically configured to determine, in the following manner, that the service network in which the UE is currently located does not support the VoLTE service: determining that a VoLTE service function is not activated in a visited public land mobile network VPLMN in which the UE is located or no VoLTE service roaming agreement is signed between the VPLMN in which the UE is located and a home public land mobile network HPLMN.

Optionally, the processor 1002 is specifically configured to determine that the VoLTE service function is not activated in the visited public land mobile network VPLMN in which the UE is located by determining existence of at least one of the following cases:

the VPLMN is not on a whitelist of networks in which a VoLTE service function is activated;

the VPLMN is on a blacklist of networks in which the VoLTE service function is not activated;

no VoLTE service roaming agreement is signed between the VPLMN and the home public land mobile network HPLMN;

a proxy-call session control function P-CSCF of the VPLMN is not on a whitelist of networks that support the VoLTE service function; and the P-CSCF of the VPLMN is on a blacklist of networks that do not support the VoLTE service function.

Optionally, the processor 1002 is specifically configured to determine, in the following manner, that the setup of voice bearer of the VoLTE service in the PS domain fails:

receiving a Re-Authentication-Request RAR message or an Abort-Session-Request ASR message by using the communications interface 1001; and after it is determined that the RAR message or the ASR message carries indication information that is used to indicate insufficiency of a bearer resource or indication information that is used to indicate a resource allocation failure, determining that the setup of voice bearer of the VoLTE service in the PS domain fails.

Optionally, the RAR message or the ASR message includes a cause value of the voice bearer setup failure of the VoLTE service.

Optionally, the cause value that is of the voice bearer setup failure of the VoLTE service and that is included in the RAR message or the ASR message is that the UE is in a weak coverage area of in the PS domain.

Optionally, before triggering the CSFB service of the UE, the processor 1002 is further configured to:

determine that the UE has registered with a circuit switched domain.

Optionally, the processor 1002 is specifically configured to determine, in the following manner, that the UE has registered with the circuit switched domain:

obtaining, from a home subscriber server HSS or a home location register HLR, information registered by the UE with a circuit switched CS network; and determining, based on the information registered by the UE with the CS network, that the UE has registered with the circuit switched domain.

Optionally, the UE is originating UE of the VoLTE service.

The processor 1002 is specifically configured to trigger the CSFB service of the UE in the following manner:

sending a first message to the originating UE by using the communications interface 1001, where the first message is used to trigger the originating UE to initiate an originating circuit switched fallback CSFB service.

Optionally, the first message includes a first cause value, and the first cause value is used to notify the originating UE of a specific reason why the VoLTE service is unavailable.

Optionally, before sending the first message to the originating UE by using the communications interface 1001, the processor 1002 is further configured to:

determine that terminating UE corresponding to the originating UE is in a pre-alerting state.

Optionally, the IMS core network device is a serving call session control function I/S-CSCF of an originating side, a service centralization and continuity application server SCC AS of an originating side, or a proxy-call session control function P-CSCF of an originating side.

Optionally, the UE is terminating UE of the VoLTE service.

The processor 1002 is specifically configured to trigger the CSFB service of the UE in the following manner:

sending a second message to a terminating domain selection device by using the communications interface 1001, where the second message is used to indicate that terminating service setup in the PS domain fails, so that the terminating domain selection device triggers a terminating circuit switched fallback CSFB service of the terminating UE.

Optionally, the second message includes a second cause value, and the second cause value is used to notify the terminating domain selection device of a specific reason why the terminating setup in the PS domain fails.

Optionally, before sending the second message to the terminating domain selection device by using the communications interface 1001, the processor 1002 is further configured to:

determine that the terminating UE is in a pre-alerting state.

Optionally, the IMS core network device is a serving call session control function I/S-CSCF of a terminating side, a service centralization and continuity application server SCC AS of a terminating side, or a proxy-call session control function P-CSCF of a terminating side.

Optionally, the sending, by the processor 1002, a second message to a terminating domain selection device by using the communications interface 1001 is specifically:

sending, by the processor 1002 of the P-CSCF of the terminating side, the second message to the I/S-CSCF of the terminating side by using the communications interface 1001, so that the I/S-CSCF of the terminating side forwards the second message to the terminating domain selection device.

It can be learned from the foregoing content that, in this embodiment of this disclosure, the IMS core network device receives the request message for setting up the VoLTE service for the UE. After determining that the VoLTE service cannot be set up, the IMS core network device triggers the CSFB service of the UE, so as to directly trigger the CSFB service of the UE when the VoLTE service cannot be set up, without reattempting to set up the VoLTE service, thereby increasing a call completion rate of the user equipment, ensuring a voice service and a supplementary service that are requested by the UE, ensuring good user experience, and avoiding a technical problem that the UE cannot be connected by using the VoLTE service and processing time is wasted.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. In addition, this disclosure may use a form of a computer program product that is implemented on one or more computer-usable storage channel (including but not limited to a disk memory, an optical memory, and the like) that include computer-usable program code.

This disclosure is described with reference to the flowcharts and/or block diagrams of the method, the device (system), and the computer program product according to the embodiments of this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine instruction, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or any other programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this disclosure without departing from the scope of this disclosure. This disclosure is intended to cover these modifications and variations provided that they fall within the scope of protection defined by the following claims of this disclosure.

What is claimed is:

1. A service processing method, wherein the method comprises:

receiving, by an Internet Protocol multimedia subsystem (IMS) core network device, a request message for setting up a Voice over Long Term Evolution (VoLTE) service for an originating user equipment (UE) in a packet switched (PS) domain;

determining, by the IMS core network device, that a terminating UE corresponding to the originating UE is in a pre-alerting state; and sending, by the IMS core network device, a message to the originating UE, wherein the message is used to trigger the originating UE to initiate an originating circuit switched fallback (CSFB) service, the message comprises a cause value, and the cause value is used to notify the originating UE of a reason why the VoLTE service is unavailable.

2. The method according to claim 1, wherein the determining that the VoLTE service cannot be set up in the PS domain, comprises:

receiving, by the IMS core network device, a Re-Authentication-Request (RAR) message or an Abort-Session-Request (ASR) message; and after determining that the RAR message or the ASR message carries indication information that is used to indicate insufficiency of a bearer resource or indication information that is used to indicate a resource allocation failure, determining, by the IMS core network device, that setup of voice bearer of the VoLTE service in the PS domain fails.

3. The method according to claim 2, wherein the RAR message or the ASR message comprises a cause value of the voice bearer setup failure of the VoLTE service.

4. The method according to claim 3, wherein the cause value that is of the voice bearer setup failure of the VoLTE service and that is comprised in the RAR message or the ASR message is that the originating UE is in a weak coverage area in the PS domain.

5. The method according to claim 1, further comprising:

determining, by the IMS core network device, that the originating UE has registered with a circuit switched domain before sending the message to the originating UE.

6. An Internet Protocol multimedia subsystem (IMS) core network device, wherein the IMS core network device comprises a communications interface and at least one processor, wherein:

the communications interface is configured to receive a request message for setting up a Voice over Long Term Evolution (VoLTE) service for an originating user equipment (UE) in a packet switched (PS) domain; and the at least one processor is configured to determine that a terminating UE corresponding to the originating UE is in a pre-alerting state;

wherein the communications interface is further configured to send a message to the originating UE, the message is used to trigger the originating UE to initiate an originating circuit switched fallback (CSFB) service, the message comprises a cause value, and the cause value is used to notify the originating UE of a reason why the VoLTE service is unavailable.

7. The IMS core network device according to claim 6, wherein the communications interface is further configured to receive a Re-Authentication-Request (RAR) message or an Abort-Session-Request (ASR) message; and the at least one processor is further configured to after determining that the RAR message or the ASR message carries indication information that is used to indicate insufficiency of a bearer resource or indication information that is used to indicate a resource allocation failure, determine that setup of voice bearer of the VoLTE service in the PS domain fails.

8. The IMS core network device according to claim 7, wherein the RAR message or the ASR message comprises a cause value of the voice bearer setup failure of the VoLTE service.

9. The IMS core network device according to claim 8, wherein the cause value that is of the voice bearer setup failure of the VoLTE service and that is comprised in the RAR message or the ASR message is that the originating UE is in a weak coverage area in the PS domain.

10. The IMS core network device according to claim 6, wherein the at least one processor is configured to determine that the originating UE has registered with a circuit switched domain before sending the message to the originating UE.

11. A non-transitory computer readable storage medium, storing an instruction, which when executed by at least one processor in an Internet Protocol multimedia subsystem (IMS) core network device, causes the IMS core network device to:

receive a request message for setting up a Voice over Long Term Evolution (VoLTE) service for an originating user equipment (UE) in a packet switched (PS) domain;

determine that a terminating UE corresponding to the originating UE is in a pre-alerting state; and send a message to the originating UE, wherein the message is used to trigger the originating UE to initiate an originating circuit switched fallback (CSFB) service, the message comprises a cause value, and the cause value is used to notify the originating UE of a reason why the VoLTE service is unavailable.

12. The non-transitory computer readable storage medium according to claim 11, wherein the instruction when executed by the at least one processor in the IMS core network device, further causes the IMS core network device to determine that the originating UE has registered with a circuit switched domain.

13. A service processing method, wherein the method comprises:

receiving, by a terminating proxy call session control function (P-CSCF) device, a request message for setting up a Voice over Long Term Evolution (VoLTE) service for a terminating user equipment (UE) in a packet switched (PS) domain;

determining, by the terminating P-CSCF device, that the terminating UE is in a pre-alerting state;

sending, by the terminating P-CSCF device, a message to a terminating domain selection device, wherein the message is used to indicate that terminating service setup in the PS domain fails, wherein the message comprises a cause value, and wherein the cause value is used to notify the terminating domain selection device of a reason why the terminating service setup in the PS domain fails; and triggering, by the terminating domain selection device according to the message, a terminating circuit switched fallback (CSFB) service of the terminating UE.

14. The method according to claim 13, wherein the message comprises a cause value, the cause value is used to notify the terminating domain selection device of a reason why the terminating setup in the PS domain fails.

15. The method according to claim 13, further comprises:

determining, by the terminating P-CSCF device, that the terminating UE has registered with a circuit switched domain before sending the message to the terminating domain selection device.

16. A system, comprising:

a terminating proxy call session control function (P-CSCF) device, the terminating P-CSCF device configured to:

receive a request message for setting up a Voice over Long Term Evolution (VoLTE) service for a terminating user equipment (UE) in a packet switched (PS) domain;

determine that the terminating UE is in a pre-alerting state; and send a message to a terminating domain selection device, wherein the message is used to indicate that terminating service setup in the PS domain fails, wherein the message comprises a cause value, and wherein the cause value is used to notify the terminating domain selection device of a reason why the terminating service setup in the PS domain fails; and the terminating domain selection device, the terminating domain selection device configured to trigger a terminating circuit switched fallback (CSFB) service of the terminating UE according to the message.

17. The system according to claim 16, wherein the message comprises a cause value, the cause value is used to notify the terminating domain selection device of a reason why the terminating setup in the PS domain fails.

18. The system according to claim 16, wherein the terminating P-CSCF device is further configured to determine that the terminating UE has registered with a circuit switched domain before sending the message to the terminating domain selection device.

* * * * *